US007505826B2

(12) United States Patent
Nakayama et al.

(10) Patent No.: US 7,505,826 B2
(45) Date of Patent: Mar. 17, 2009

(54) CONFIGURATION METHOD OF DIGITAL AUDIO MIXER

(75) Inventors: Kei Nakayama, Hamamatsu (JP); Masaru Aiso, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 0 days.

(21) Appl. No.: 11/586,754

(22) Filed: Oct. 25, 2006

(65) Prior Publication Data

US 2007/0043462 A1 Feb. 22, 2007

Related U.S. Application Data

(62) Division of application No. 10/165,639, filed on Jun. 7, 2002.

(30) Foreign Application Priority Data

Jun. 13, 2001 (JP) ............................ 2001-179242
Jun. 13, 2001 (JP) ............................ 2001-179243

(51) Int. Cl.
*G06F 17/00* (2006.01)
*H04B 1/00* (2006.01)

(52) U.S. Cl. ........................................ 700/94; 381/119

(58) Field of Classification Search ................... 700/94; 381/119
See application file for complete search history.

(56) References Cited

U.S. PATENT DOCUMENTS 4,509,190 A 4/1985 Spector
4,879,751 A * 11/1989 Franks et al. ............... 381/119
5,339,362 A * 8/1994 Harris ......................... 381/86
5,396,618 A 3/1995 Fukui et al.
5,402,501 A * 3/1995 Silfvajt et al. ............... 381/119
5,758,177 A 5/1998 Gulick et al.
5,852,800 A 12/1998 Modeste et al.

(Continued)

FOREIGN PATENT DOCUMENTS

GB 2140248 A * 11/1984

OTHER PUBLICATIONS

Technical Note HW520 NuBus Expansion Interface Q&As, various dates from 1989-1993, retired version, pp. 1-10.

(Continued)

*Primary Examiner*—Curtis Kuntz
*Assistant Examiner*—Daniel R Sellers
(74) *Attorney, Agent, or Firm*—Morrison & Foerster LLP

(57) ABSTRACT

A configuration method is performed for controlling an audio apparatus having a main block configurable for processing audio signals such as modifying and mixing of the audio signals, and peripheral units of various types being equipped with components of various types and being connectable to the main block for inputting the audio signals to be processed and outputting the audio signals processed by the main block. A first detection step is carried out for detecting when a new peripheral unit is connected to the main block. A second detection step is carried out for detecting a type of the new peripheral unit. An inquiry step is conducted for inquiring the new peripheral unit upon detection thereof about a type of a component equipped in the new peripheral unit and obtaining a reply indicating the type from the new peripheral unit. Thus, the main block can be configured according to the detected type of the new peripheral unit and the type of the component thereof indicated by the reply.

15 Claims, 27 Drawing Sheets

U.S. PATENT DOCUMENTS

| | | | | |
|---|---|---|---|---|
| 5,883,804 | A | | 3/1999 | Christensen |
| 6,185,627 | B1 | | 2/2001 | Baker et al. |
| 6,594,363 | B1 | | 7/2003 | Kim |
| 6,870,936 | B1 | | 3/2005 | Ajamian |
| 7,006,642 | B1 | * | 2/2006 | Kumai ........................ 381/119 |

OTHER PUBLICATIONS

Vail, Mark, "Roland VS-1680 Digital Studio Workstation", Feb. 1999, pp. 1-4.

* cited by examiner

750

781
782
783
784
785
786
787

CONFIGURATION METHOD OF DIGITAL AUDIO MIXER

CROSS-REFERENCE TO RELATED APPLICATIONS

This application is a division of U.S. application Ser. No. 10/165,639 filed on Jun. 7, 2002, the entire contents of which are incorporated herein by reference.

BACKGROUND OF THE INVENTION

1. Technical Field of the Invention

The present invention relates to an audio signal processing apparatus typically for use in mixing of audio signals in a concert hall, and a computer program executable to perform the configuring and controlling method of such an audio signal processing apparatus.

2. Prior Art

On a mixing console of the audio signal processing apparatus, a plurality of input signals and output signals needs to be assigned to a plurality of input channels and output channels, respectively. Especially, the "input signal" includes a digital audio input and an analog audio input. The analog input is categorized into a microphone input, a line input, etc. according to input levels. Different input peripheral units are needed depending on types of input signals. Also, different output peripheral units are needed depending on whether the output signal digital or analog. It is desirable to assign a plurality input/output peripheral units to appropriate input/output channels without changing physical wire connections states between a plurality of input/output peripheral units and the mixing console. By such a configuration, the arrangement of a fader and other controls can be optimized according to occasional situations at a concert, etc. For this purpose, there are provided many mixing consoles having an input/output patch capable of assigning physical wire connections for input/output signals to any input/output channels.

Generally, the concert hall is equipped with various acoustic facilities. In many cases, however, fixed acoustic facilities may be insufficient for a music performance depending on its nature. In such a case, additional acoustic facilities need to be brought into the hall from the outside. Usually, the time given to this work is very tight. Various installation works must be carried out promptly.

Conventionally, a worker needs to check which input/output peripheral unit is actually connected to the mixing console in order to configure input/output patches on the mixing console. This has been hindrance to a prompt work. Ever after the input/output patch setting, various levels and parameters need to be configured, making it difficult to reduce working amount.

SUMMARY OF THE INVENTION

The present invention has been made in consideration of the foregoing drawback of the prior art. It is therefore an object of the present invention to provide an audio signal processing apparatus capable of promptly and accurately installing a mixing console, a method of controlling and configuring the audio signal processing apparatus, and a computer program executable for realizing the method of controlling and configuring the audio signal processing apparatus.

A first inventive method is designed for controlling an audio apparatus having a main block configurable for processing audio signals such as modifying and mixing of the audio signals, and peripheral units of various types being equipped with components of various types and being connectable to the main block for inputting the audio signals to be processed and outputting the audio signals processed by the main block. The inventive method is carried out by a first detection step of detecting when a new peripheral unit is connected to the main block, a second detection step of detecting a type of the new peripheral unit, and an inquiry step of inquiring the new peripheral unit upon detection thereof about a type of a component equipped in the new peripheral unit and obtaining a reply indicating the type from the new peripheral unit, whereby the main block can be configured according to the detected type of the new peripheral unit and the type of the component thereof indicated by the reply.

Preferably, the main block has physical channels allocatable to the peripheral units for inputting or outputting the audio signals and logical channels configurable for processing the audio signals. The inventive method further comprises a display step of displaying a correspondence between the physical channels and the logical channels., and an update step of updating the displayed correspondence when the new peripheral unit is connected to the main block according to either of the type of the new peripheral unit and the type of the component of the new peripheral unit.

Preferably, the peripheral units of the various types have a connector comprised of a set of pins disposed in a strap arrangement specific to the type of the peripheral unit for connection with the main block, such that the second detection step detects the type of the new peripheral unit according to the specific strap arrangement of the pins of the new peripheral unit.

Preferably, the inventive method further comprises a configuration step of generating a configuration screen on a display monitor to present parameters of the new peripheral unit or the component thereof based on either of the type of the new peripheral unit or the type of the component equipped in the new peripheral unit, such that the parameters can be set on the configuration screen for configuring the main block. Further, 5. the configuration step comprises displaying the configuration screen containing the parameters arranged in correspondence to channels of the audio signals provided in the main block for processing the audio signals.

A second inventive method is designed for controlling an audio apparatus having a main block configurable for processing audio signals through logical channels, and peripheral units connectable to the main block through physical channels for inputting the audio signals to be processed or outputting the audio signals processed by the main block. The inventive the method is carried out by a first display step of displaying a correspondence on a monitor between the physical channels allocated to the peripheral units which are actually connected or potentially connectable, such that the displayed correspondence may have initially a non-organized arrangement, a detection step of detecting a command to rearrange the correspondence between the physical channels and the logical channels, and a second display step of again displaying the correspondence which is rearranged in response to the detecting of the command from the initial non-organized state into a renewed organized state according to a predetermined rule.

Preferably, the first and second display steps display the correspondence in a matrix such that the physical channels are arranged in one of rows and columns of the matrix and the logical channels are arranged in the other of rows and columns of the matrix so that a pair of a physical channel and a logical channel corresponding to each other is indicated by a symbol placed at an intersection between the row and the column of the matrix.

A third inventive method is designed for controlling an audio apparatus comprised of a main block having channels for processing audio signals, and peripheral units of various types having parameters configurable for inputting the audio signals to the main block and outputting the audio signals from the main block, the peripheral units including a real peripheral unit actually connected to the main block and a virtual peripheral unit reserved for potential connection to the main block. The inventive method is carried out by a first configuration step of conducting configuration of the virtual peripheral unit upon identification of the type of the virtual peripheral unit, the configuration including at least one of setting of the parameters of the virtual peripheral unit and allocating of the cannel to the virtual peripheral unit, a detection step of detecting a new peripheral unit which is newly connected to the main block, and a second configuration step conducted when the type of the detected new peripheral unit is identical to the type of the virtual peripheral unit for allowing the new peripheral unit to succeed the configuration of the virtual peripheral unit.

Preferably, the first configuration step comprises identifying a type of a virtual component equipped in the virtual peripheral unit and conducting configuration of the virtual component according to the identified type thereof, the configuration including at least one of setting of parameters of the virtual component and allocating of the channel to the virtual component, and the second configuration step is conducted when a type of a component equipped in the new peripheral unit is identical to the type of the virtual component for allowing the component of the new peripheral unit to succeed the configuration of the virtual component.

Preferably, the first configuration step comprises identifying a type of a virtual component potentially equipped in the virtual peripheral unit and conducting configuration of the virtual component according to the identified type thereof by setting of parameters of the virtual component, and the second configuration step is conducted when a type of a component equipped in the new peripheral unit is not identical to the type of the virtual component for prompting an operator of the audio apparatus to select either of reserving the setting of the parameters of the virtual component in the main block or replacing the setting of the parameters of the virtual component by new setting of parameters of the component equipped in the new peripheral unit.

A fourth inventive method is designed for controlling an audio apparatus comprised of a main block having channels for processing audio signals, and peripheral units of various types having parameters configurable for inputting the audio signals to the main block and outputting the audio signals from the main block, the peripheral units including a real peripheral unit actually connected to the main block and a virtual peripheral unit reserved for potential connection to the main block. The inventive method is carried out by a first configuration step of conducting configuration of the virtual peripheral unit upon identification of the type of the virtual peripheral unit, the configuration including at least one of setting of the parameters of the virtual peripheral unit and allocating of the cannel to the virtual peripheral unit, a detection step of detecting a new peripheral unit which is newly connected to the main block, a prompt step called when a type of the detected new peripheral unit is not identical to the type of the virtual peripheral unit for prompting an alarm together with a first option and a second option, a reservation step conducted when the first option is selected for reserving the configuration of the virtual peripheral unit, and a second configuration step conducted when the second option is selected for replacing the setting of the parameters of the virtual peripheral unit by setting of parameters of the new peripheral unit.

A fifth inventive method is designed for controlling an audio apparatus comprised of a main block having channels for processing audio signals, and peripheral units having parameters settable for inputting the audio signals to the main block and outputting the audio signals from the main block. The inventive method is carried out by a configuration step of conducting configuration for each of the peripheral units connected to the main block, the configuration including at least one of setting of the parameters of each peripheral unit and allocating of the channels to each peripheral unit, a detection step of detecting when at least one of the peripheral units is disconnected from the main block, a prompt step of prompting disconnection of said one peripheral unit to an operator of the audio apparatus along with a first option and a second option, a reservation step called when the first option is selected by the operator for reserving the configuration of said one peripheral unit in the main block while indicating that said one peripheral unit is actually disconnected from the main block, and a cancel step called when the second option is selected by the operator for canceling the configuration of said one peripheral unit from the main block.

DETAILED DESCRIPTION OF THE EMBODIMENTS

1. Construction of Embodiment 1.1 Overall Structure

Figure 1:
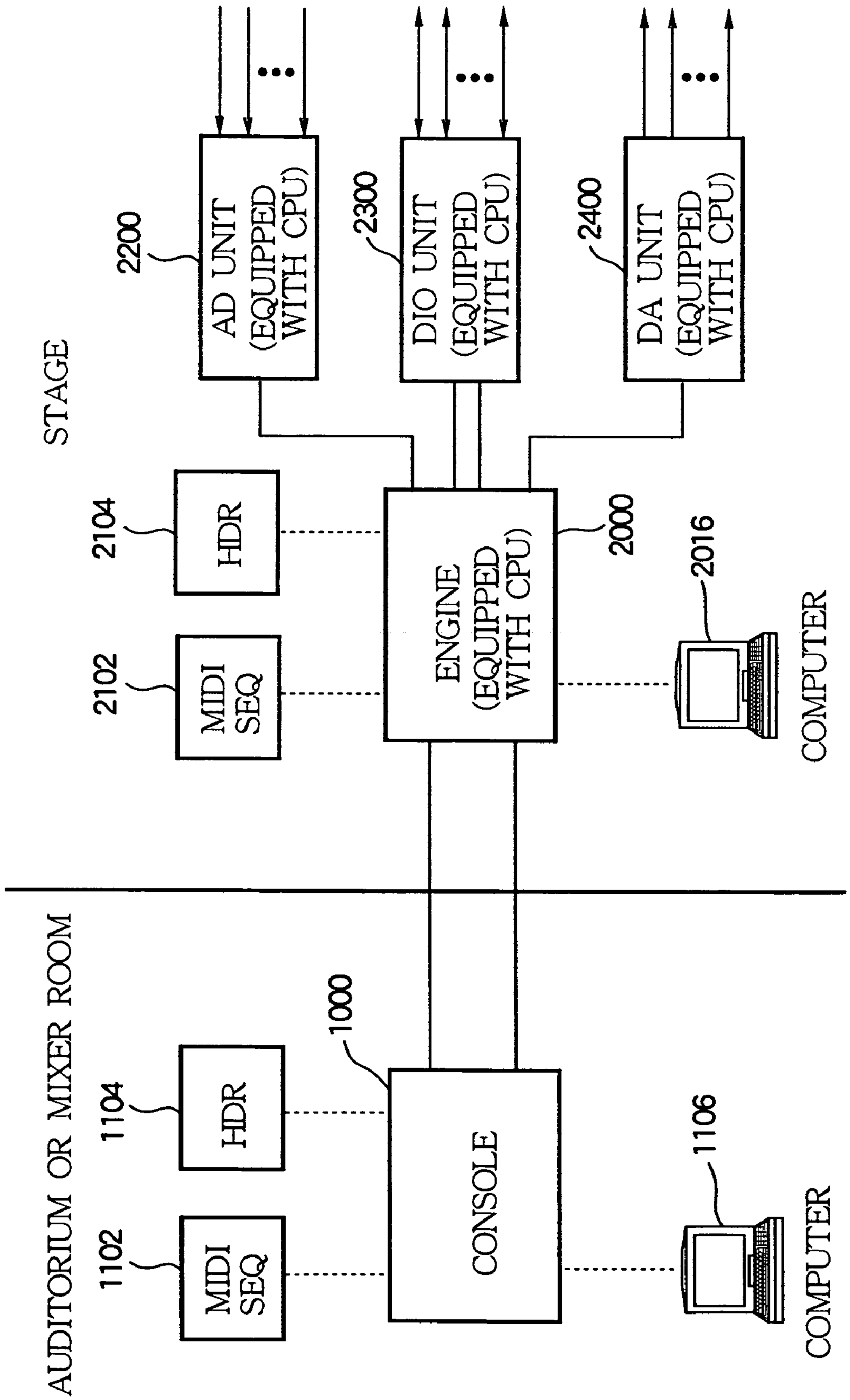
FIG. 1 is an overall block diagram of a digital mixing system according to an embodiment of the present invention.

Referring now to FIG. 1, the following describes an overall structure of a digital mixing system as an embodiment of the present invention.

In FIG. 1, the reference numeral 1000 denotes a console equipped with a fader for loudness control, an operation device for tone control and a display device for displaying various data. The console 1000 connects with a MIDI sequencer 1102 and a hard disk recorder 1104. The reference numeral 1106 represents a personal computer which is connected to the console 1000 as needed and is used for various settings. Settings available on the personal computer 1106 can be also performed on the console 1000 itself. Nevertheless, the settings of the console 1000 can be completed promptly if the personal computer 1106 is used for setting beforehand and the setting result is transferred to the console 1000.

The above-mentioned console 1000 is installed in an auditorium or a mixer room prior to the music performance.

The reference numeral 2000 denotes an engine, which actually conducts processes of audio signals such as mixing of audio signals and application of effect to the audio signals based on operations of the console 1000. The engine 2000 also connects with a MIDI sequencer 2102 and a hard disk recorder 2104. The personal computer 2106 can be connected to the engine 2000 for configuring input/output patch settings.

The reference numeral 2200 represents an AD unit which converts an analog input from the outside such as a microphone input or a line input to a digital signal and supplies it to the engine 2000. The reference numeral 2400 denotes a DA unit, which converts a digital signal from the engine 2000 and supplies it to a power amplifier. The reference numeral 2300 represents a digital input/output unit, which interchanges a digital signal with other engines etc. The above-mentioned engine 2000, input and output peripheral units 2200 through 2400 are installed in a backstage of a concert hall.

1.2 Structure of the Console 1000

Figure 2:
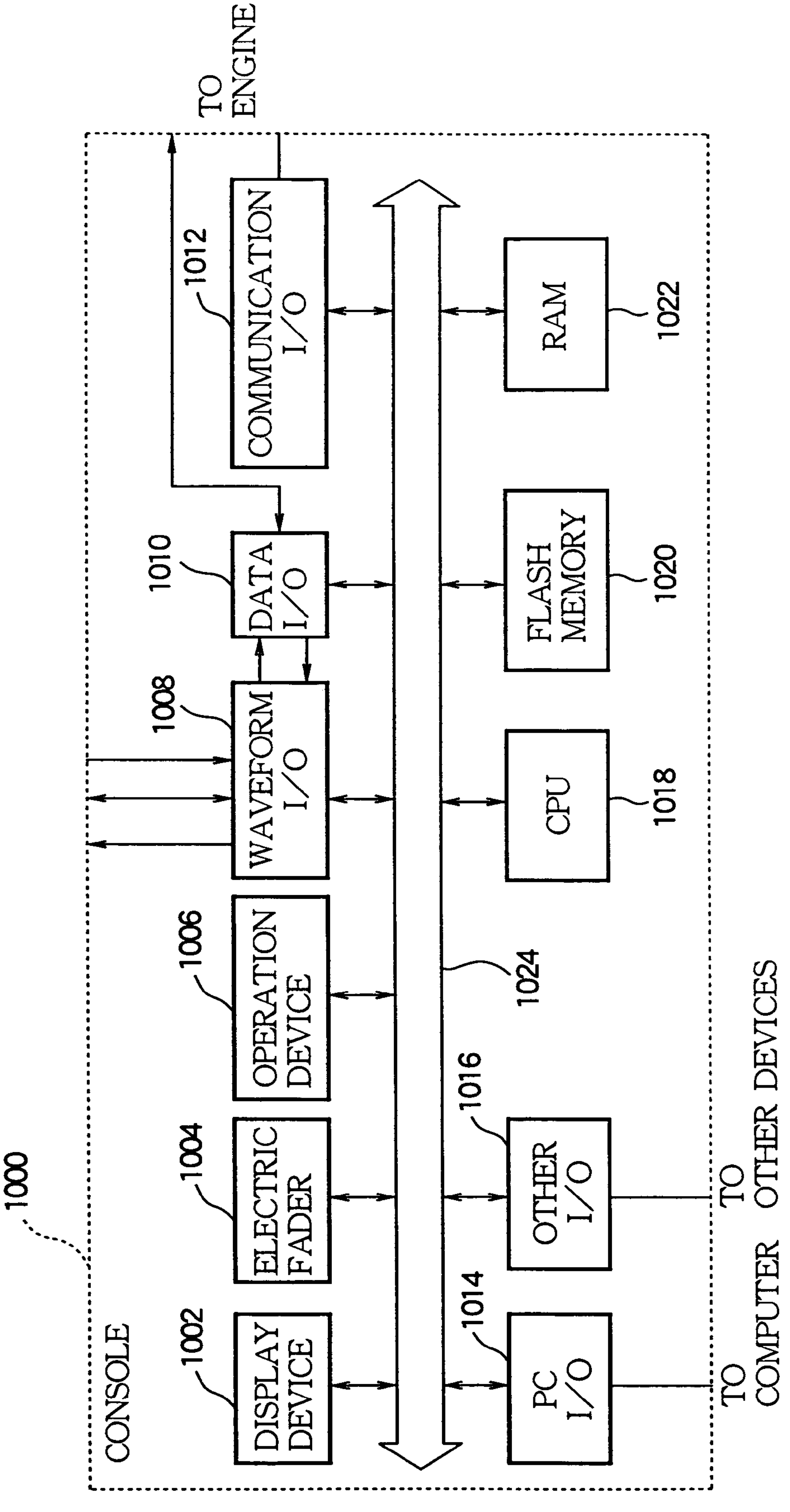
FIG. 2 is a block diagram of a console 1000 according to the embodiment.

The structure of the console 1000 will now be described with reference to FIG. 2. In the figure, the reference numeral 1008 represents a waveform I/O section responsible for input/output operations of analog signals. According to the embodiment, the engine 2000 processes mixing and effect application of various audio signals. However, it is convenient if the console 1000 can be directly supplied with an audio signal output from the MIDI sequencer 1102 and the hard disk recorder 1104 installed near an operator at the console 1000. During a rehearsal, for example, it is desirable that the operator at the console 1000 can give instructions using a microphone to other operators in a backstage. Further, the operator may need to monitor individual input/output channels during a music performance in the concert hall. For this purpose, the waveform I/O section 1008 has a small-scale input/output capability of analog signals. Namely, the waveform I/O section 1008 outputs the supplied digital signal for monitoring in an analog form and converts the input analog signal to a digital signal for output.

The reference numeral 1010 denotes a data I/O section which supplies the waveform I/O section 1008 with a digital audio signal for monitoring supplied from the engine 2000. The data I/O section 1010 also outputs to the engine 2000 a digital audio signal output via the waveform I/O section 1008. The reference numeral 1002 represents a display device, which displays various information to an operator based on display instructions supplied via a bus 1024. The reference numeral 1004 denotes an electric fader. When operated by an operator, the electric fader outputs the corresponding operation position via the bus 1024. The electric fader is driven according to setting information supplied via the bus 1024, thereby automatically setting the fader positions.

The reference numeral 1006 represents an operation device for editing timbre parameters such as filter characteristics. The operation device 1006 also outputs operational information via the bus 1024. The operation device 1006 is driven according to setting information supplied via the bus 1024, thereby automatically setting operational positions. The reference numeral 1012 denotes a communication I/O section, which interchanges various control signals with the engine 2000. The reference numeral 1014 represents a PC I/O section, which interchanges various setting information with the personal computer 1106. The reference numeral 1016 denotes an additional I/O section, which interchanges information with other various devices.

The reference numeral 1018 represents a CPU which controls each section via the bus 1024 by executing a control program to be described later. The reference numeral 1020 denotes flash memory, which stores the control program and setting information for the digital mixing system. The reference numeral 1022 represents RAM used as a work memory for the CPU 1018.

1.3 Structure of the Engine 2000

Figure 3:
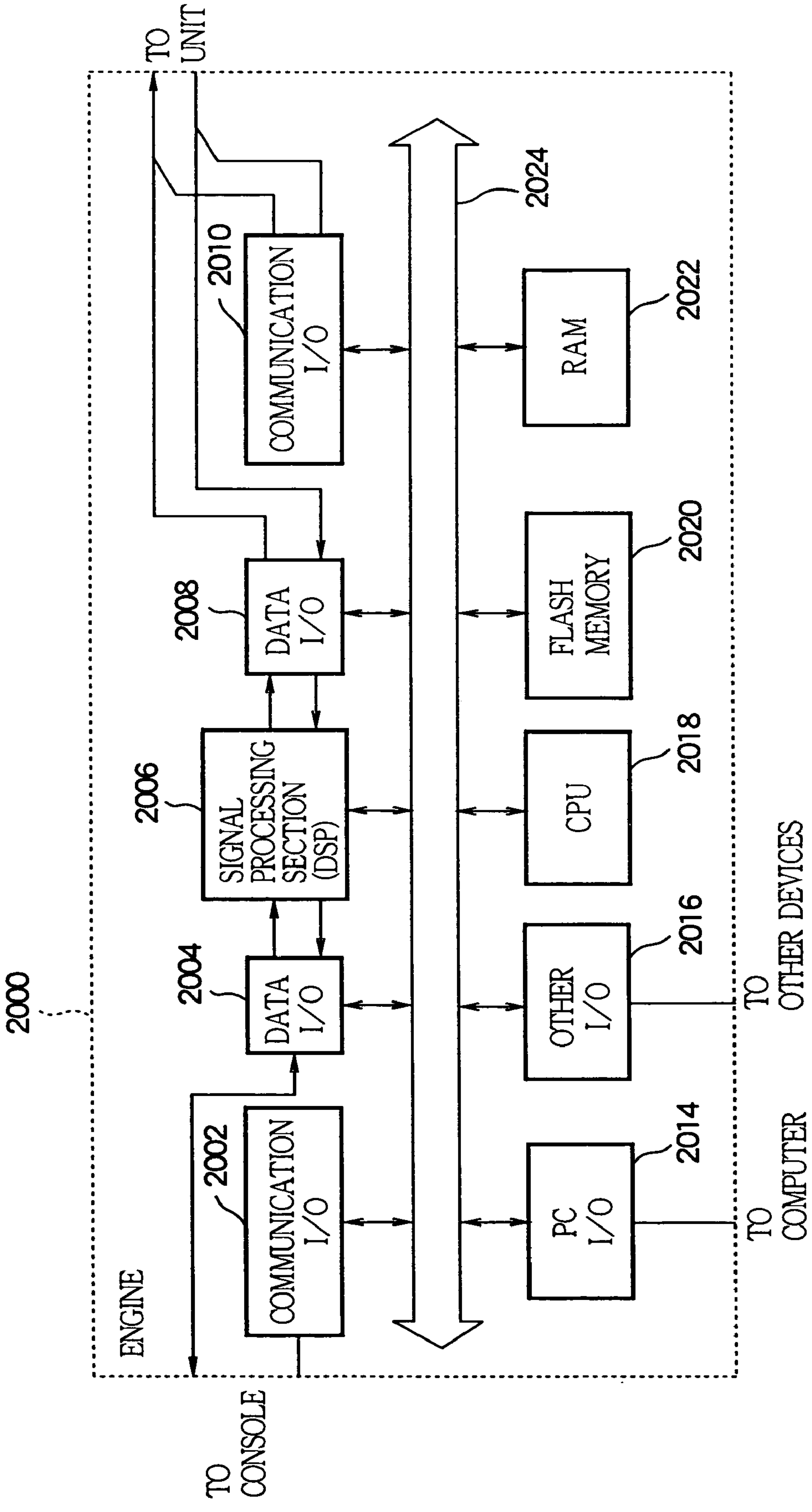
FIG. 3 is a block diagram of an engine 2000 according to the embodiment.

The configuration of the engine 2000 will now be described with reference to FIG. 3. The reference numeral 2002 represents a communication I/O section, which interchanges various control signals with the communication I/O section 1012 on the console 1000. The reference numeral 2004 denotes a data I/O section, which interchanges a digital audio signal with the data I/O section 1010. The reference numeral 2008 represents a data I/O section, which interchanges a digital audio signal with the AD unit 2200, a digital I/O unit 2300, and a DA unit 2400. The reference numeral 2010 denotes a communication I/O section, which interchanges various control signals with the units 2200 through 2400.

The reference numeral 2006 represents a signal processing section comprising a group of DSPs (digital signal processors). The signal processing section 2006 applies mixing process or effect process to digital audio signals received via the data I/O sections 2004 and 2008, and outputs the processed results to the peripheral units 2200 through 2400 and the console 1000 via the I/O sections 2004 and 2008. The reference numeral 2014 denotes a PC I/O section, 2016 an additional I/O section, 2018 a CPU, 2020 a flash memory, and 2022 a RAM. These sections are configured in the same manner as the constituent elements 1014 through 1022 on the console 1000 as mentioned above.

In the engine 2000, configuration of an input/output patch, a fader amount and a timbre setting state are generically referred to as an "algorithm". As mentioned above, the flash memory 1020 of the console 1000 stores the algorithm. On the other hand, the flash memory 2020 in the engine 2000 stores programs, but not the algorithm. When the console 1000 is connected to the system, the console 1000 specifies one of the algorithm in the engine 2000. When the console 1000 is not connected, the personal computer 2106 connected to the PC I/O section 2014 specifies the algorithm. In other words, the console 2000 takes precedence over the personal computer 2106, thereby making clear a source and a master of setting the algorithm.

1.4 Configuration of the Peripheral Units 2200 through 2400

The data I/O section 2008 in the engine 2000 is provided with ten input terminals and six output terminals (not shown). One AD unit 2200 exclusively uses one input terminal. One DA unit 2400 exclusively uses one output terminal. One digital I/O unit 2300 exclusively uses up to two input terminals and up to two output terminals. As long as there are free input terminals and output terminals, any of the peripheral units 2200 through 2400 can be connected to the engine 2000. The peripheral units 2200 through 2400 are capable of plug and play (hot plug-in) features with respect to the engine 2000.

Figure 14:
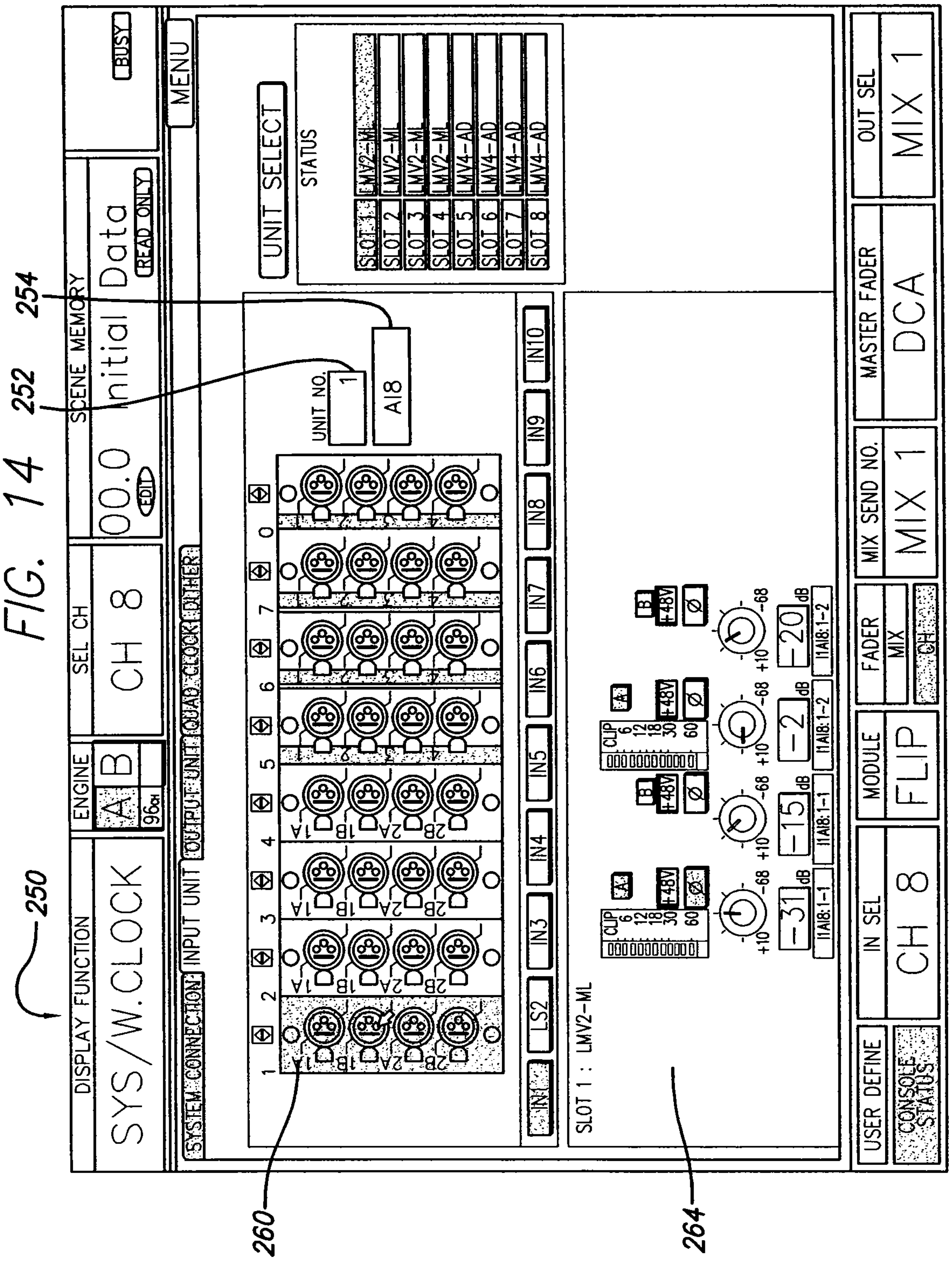
FIG. 14 shows a display example of an input peripheral unit window 250 for a real unit.

One AD unit 2200 has eight slots for mounting up to eight cards. The top half of FIG. 14 shows an external view of the AD unit 2200 mounted with cards. The AD unit 2200 is capable of mounting a 2-channel microphone-level input card or a 4-channel line-level input card.

One DA unit 2400 has eight slots for mounting up to eight cards as components. The DA unit 2400 is capable of mounting only a 4-channel analog output card. One digital I/O unit 2300 has eight slots for mounting up to eight cards. The digital I/O unit 2300 is capable of mounting only a digital input/output card having an 8-channel digital input and an 8-channel digital output. In addition, it is possible to use any types of cards corresponding to the digital audio signal formats AES/EBU, ADAT, and TASCAM (all trademarks).

1.5 Overall Configuration of the Algorithm in the Signal Processing Section 2006

Figure 4:
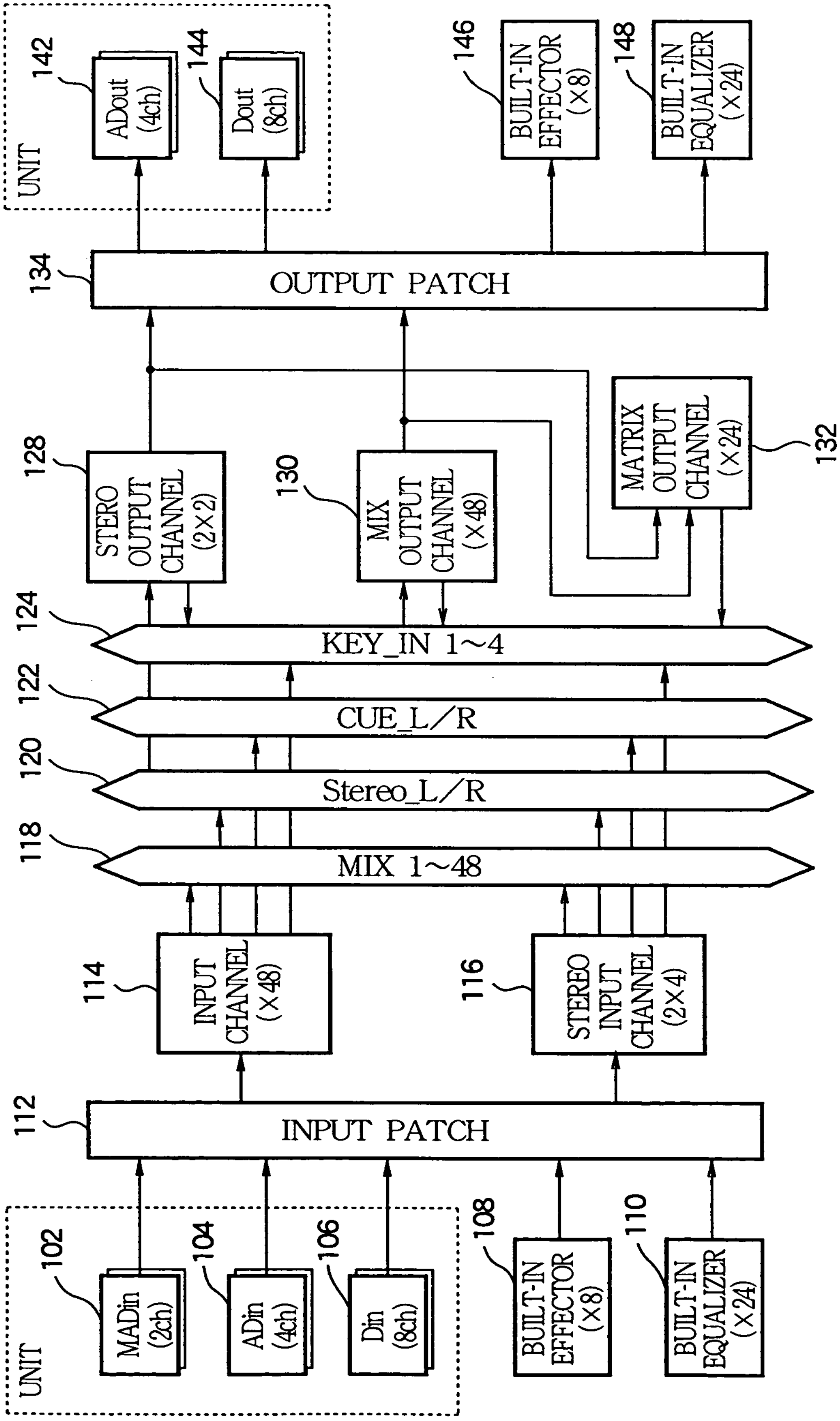
FIG. 4 is a block diagram of an algorithm implemented in a signal processing section 2006 according to the embodiment.

Referring now to FIG. 4, the following describes the contents of the algorithm implemented in the signal processing section 2006. The reference numeral 102 denotes one or more microphone-level input cards inserted into the AD unit 2200. Likewise, the reference numeral 104 represents one or more line-level input cards inserted into the DA unit 2400. The reference numeral 106 denotes an input section of one or more digital input/output cards inserted into the digital I/O unit 2300. The reference numeral 142 represents one or more analog output cards inserted into the DA unit 2400, and 144 denotes an output section of the digital input/output card. These peripheral units enclosed in a broken line in FIG. 4 is constructed by a hardware separately from the signal processing section 2006. The software in the signal processing section 2006 implements the remaining constituent elements depicted in FIG. 4.

The reference numeral 108 denotes a built-in effector for providing effect processing to up to eight input channels. The reference numeral 110 represents a built-in equalizer capable of providing up to 24 input channels with equalization such as frequency characteristics of a microphone. The reference numeral 114 denotes a monophonic input channel adjustment section which adjusts loudness, tone, etc. for up to 48 input channels based on operations on the console 1000. The reference numeral 116 represents a stereophonic input channel adjustment section, which adjusts loudness and tone for up to four sets of stereophonic input channels based on operations on the console 1000. Here, one set comprises two monophonic channels.

The reference numeral 112 denotes an input patch section. When a digital audio signal is supplied from the microphone-level input card 102, the line-level input card 104, or the input section 106 of the digital input/output card, the input patch section assigns the digital audio signal to any channel in the channel adjustment sections 114 and 116. As mentioned above, the built-in effector 108 or the built-in equalizer 110 applies effect or equalizing processing to the digital audio signal. The processed digital audio signal is supplied to the input channel adjustment sections 114 and 116.

The reference numeral 120 denotes a stereo bus for mixing a digital audio signal, whose loudness is adjusted by faders in the input channel adjustment sections 114 and 116. The mixed result is supplied to a 2-by-2-channel stereo output section 128 and is used as an audio signal mainly broadcast to an entire auditorium. Each channel is provided with a multi-channel loudness control in addition to the fader. An adjusted result from one of the channels is supplied to a MIX bus 118. A mixed result from the MIX bus 118 is supplied to a MIX output channel section 130 and is used for echo back to a music performer on the stage, recording, and other various purposes. The MIX output channel section 130 can output up to 48 channels of a digital audio signal.

The reference numeral 122 denotes a cue bus. The electric fader 1004 is provided for each input channel on the console 1000. Near the electric fader 1004, there is provided a switch for specifying whether or not to supply a digital audio signal to the cue bus. Turning on this switch supplies the digital audio signal to the console 1000 via the cue bus 122 and the data I/O section 2004. Consequently, an operator at the console 1000 can monitor an audio signal from one or more input/output channels specified by the operator.

The reference numeral 132 denotes a matrix output channel section, which further mixes and outputs mixing results from the stereo output channel section 128 and the MIX output channel section 130. Then, mixing results from the stereo output channel section 128, the MIX output channel section 130, and the matrix output channel section 132 are supplied to a key-in bus 124 and an output patch section 134. The reference numeral 146 represents a built-in effector for applying effect processing to up to eight input channels. The reference numeral 148 denotes a built-in equalizer which can provide up to 24 output channels with equalizing processing such as an acoustic field adjustment for an entire concert hall.

A digital audio signal is output from the stereo output channel section 128, the MIX output channel section 130, or the matrix output channel section 132. The output patch section 134 assigns these digital audio signals to channels in the analog output card 142 or the output section 144 of the digital input/output card. Here, the built-in effector 146 or the built-in equalizer 148 applies effect or equalizing processing to the digital audio signal as needed. The processed digital audio signal is supplied to the analog output card 142 or the output section 144 of the digital input/output card.

The above-mentioned input patch section 112 can be supplied with various audio signals (not shown) such as a reproduction signal from the hard disk recorder 2104. Likewise, the output patch section 134 can output audio signals to the constituent elements such as the hard disk recorder 2104 for recording and the data I/O section 1010 for monitoring. An output signal from the built-in effector 146 or the built-in equalizer 148 can be supplied to the input patch section 112. Accordingly, after a given mixing result is subject to an effect process or equalizing process, the processed result can be returned to the input patch section 112 to be used as a new input signal.

2. Operations of the Embodiment 2.1 Outline of Operations 2.1.1 Unit Selection Window (Initial Screen, FIG. 16)

The following outlines the operation of the embodiment with reference to FIGS. 13 through 26. These figures show display contents of the display device 1002 on the console 1000.

Figure 16:
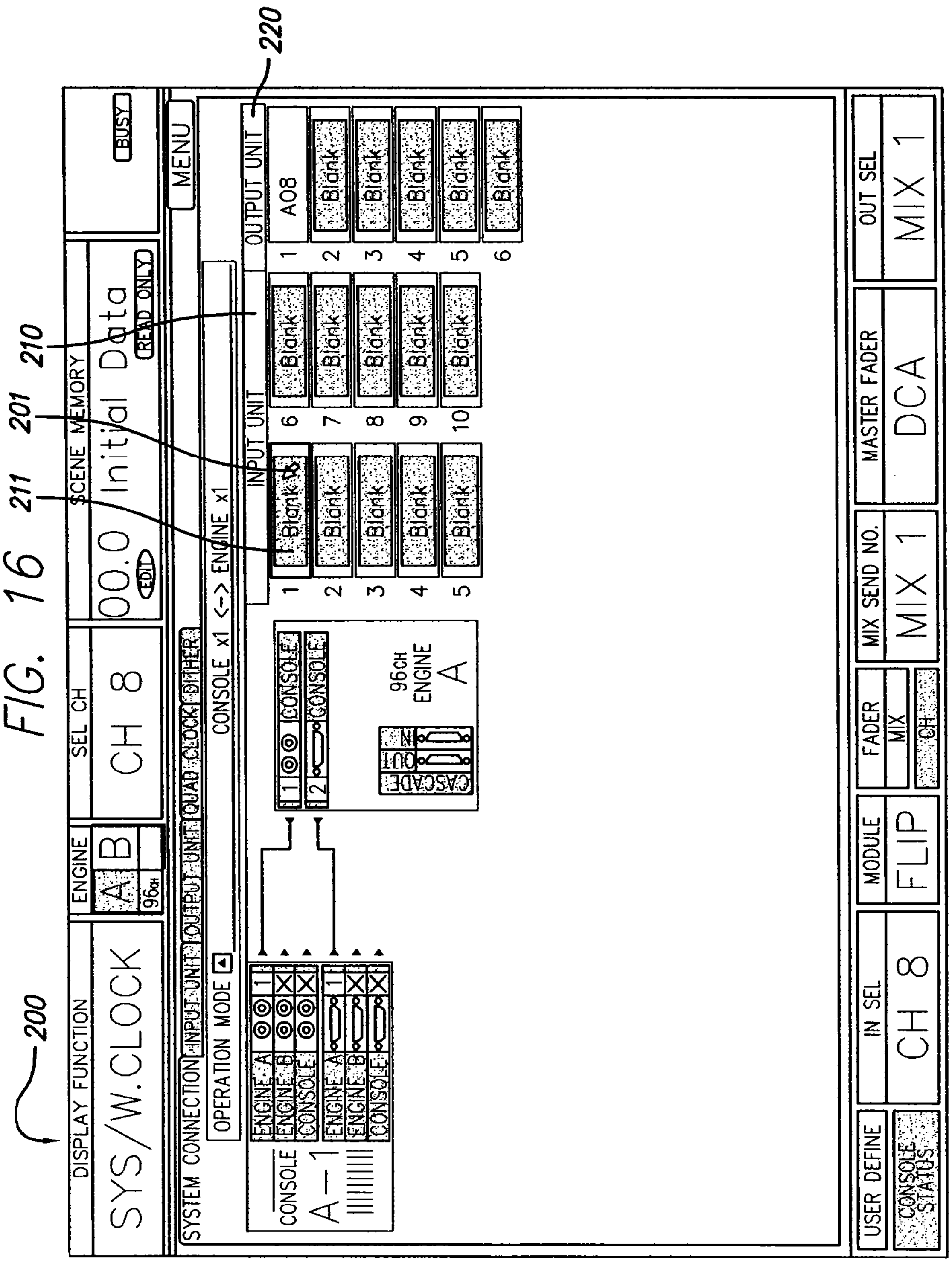
FIG. 16 shows another display example of the unit selection window 200.

When an operator performs a given operation using the operation device 1006, the display device 1002 displays a unit selection window 200 in FIG. 16. In the unit selection window 200, the reference numeral 210 denotes an input peripheral unit selection section which shows units connected to ten input terminals of the engine 2000. In the example, all input terminals are marked as "Blank". This shows that no units are actually connected to the input terminals of the engine 2000.

The reference numeral 220 denotes an output peripheral unit selection section, which shows units connected to at most six output terminals of the engine 2000. The example shows "A08" corresponding to the first output terminal. The code "A08" is a model number of the DA unit 2400, showing that the DA unit 2400 is connected here. No units are connected to the other output terminals (second to sixth). According to the embodiment, the unit selection window 200 displays an actually connected unit (hereafter referred to as a real unit) with gray characters on a white background as shown in FIG. 16. The window displays a unit not actually connected (hereafter referred to as a virtual unit) with gray characters on a black background.

Let us suppose that an operator at the console 1000 configures setting for a unit actually connected (or to be connected in future) to any input or output terminal. He or she clicks an icon corresponding to the input/output terminal in FIG. 16 by using a pointing device included in the operation device 1006. For example, the operator positions a cursor 201 to an icon 211 corresponding to the first input terminal, and then clicks the pointing device. This operation calls an input peripheral unit window 250 (FIG. 17) corresponding to the selected input/output terminal.

Figure 17:
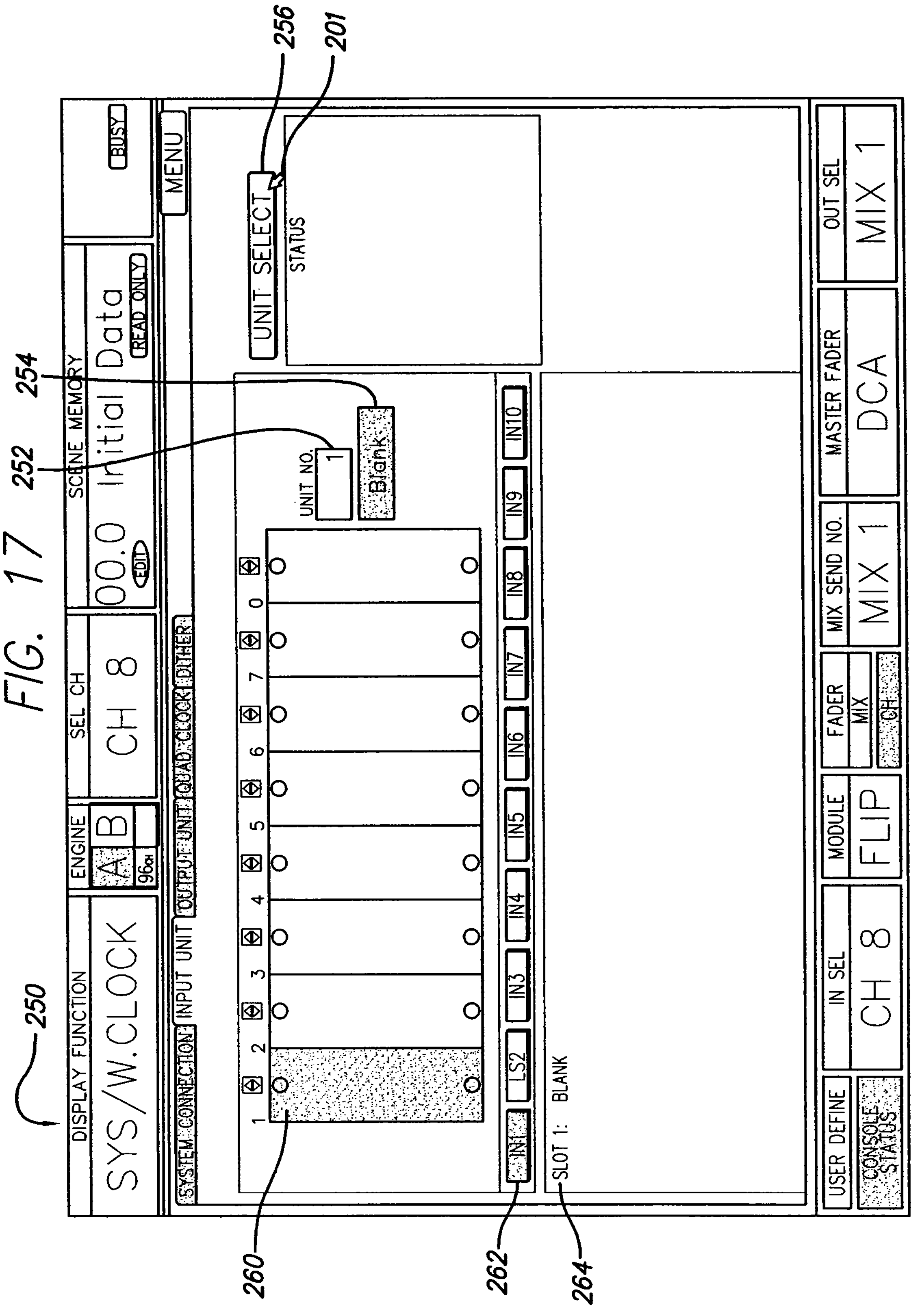
FIG. 17 shows a display example of the input peripheral unit window 250 for a "Blank" unit.

2.1.2 Input Peripheral Unit Window 250 (FIG. 17)

In FIG. 17, the input peripheral unit window 250 displays images representing units 2200 through 2400. The reference numeral 252 denotes a unit number display section which displays a unit number ('1' in the example) of the corresponding unit. The reference numeral 254 represents a unit name display section. It displays "Blank" in the example because no units are available currently. The reference numeral 256 denotes a unit selection button. The operator can click this button to change the unit corresponding to the unit number. The reference numeral 260 represents a card display section which displays an image representing a card actually inserted (or to be inserted) into the unit.

The reference numeral 264 denotes a card status display section, which displays the state of a card (the first card in the example) selected by the pointing device. Since the first card is "Blank", the card status display section displays this state only. By referring to the input peripheral unit window 250, the operator can specify a card to be inserted into the first through eighth slots. Because the unit type is undefined according to the state in the figure, it is impossible to list mountable cards. The operator then clicks a unit selection button 256 using the pointing device to display a unit selection window 300 in FIG. 18.

Figure 18:
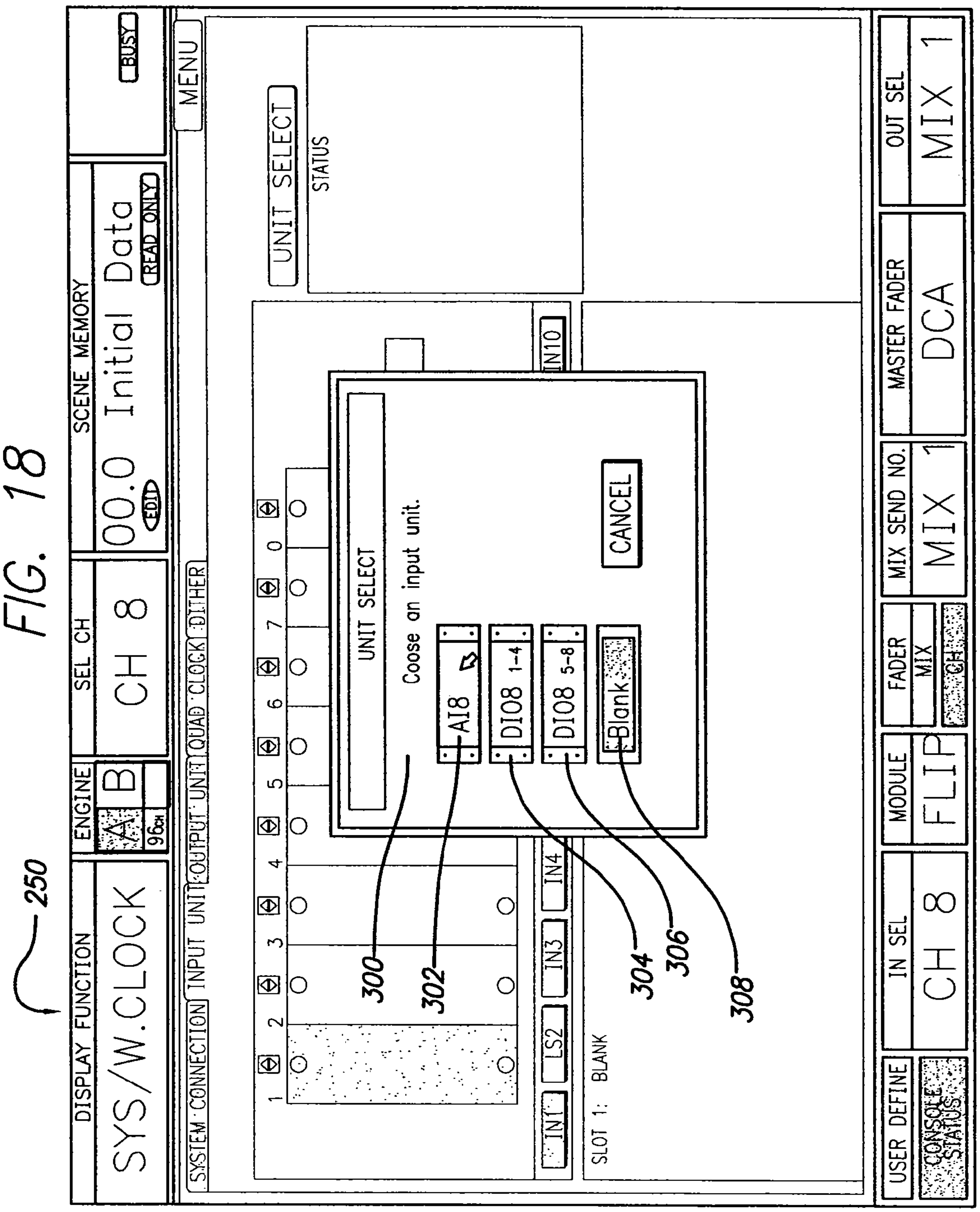
FIG. 18 shows a display example of a unit selection window 300.

2.1.3 Unit Selection Window 300 (FIG. 18)

The unit selection window 300 displays candidates for selectable units as virtual units. The reference numeral 302 denotes a DA unit selection button for selecting the AD unit 2200 (model number AI8). The reference numerals 304 and 306 represent digital I/O unit selection buttons for selecting the digital I/O unit 2300. The digital I/O unit 2300 uses a total of eight digital input/output cards. Different input terminals are used for the first four cards and the remaining four cards. Two selection buttons 304 and 306 are used to select either group of cards. A unit disconnection button 308 is provided because the first input terminal may need to be kept "Blank".

Figure 19:
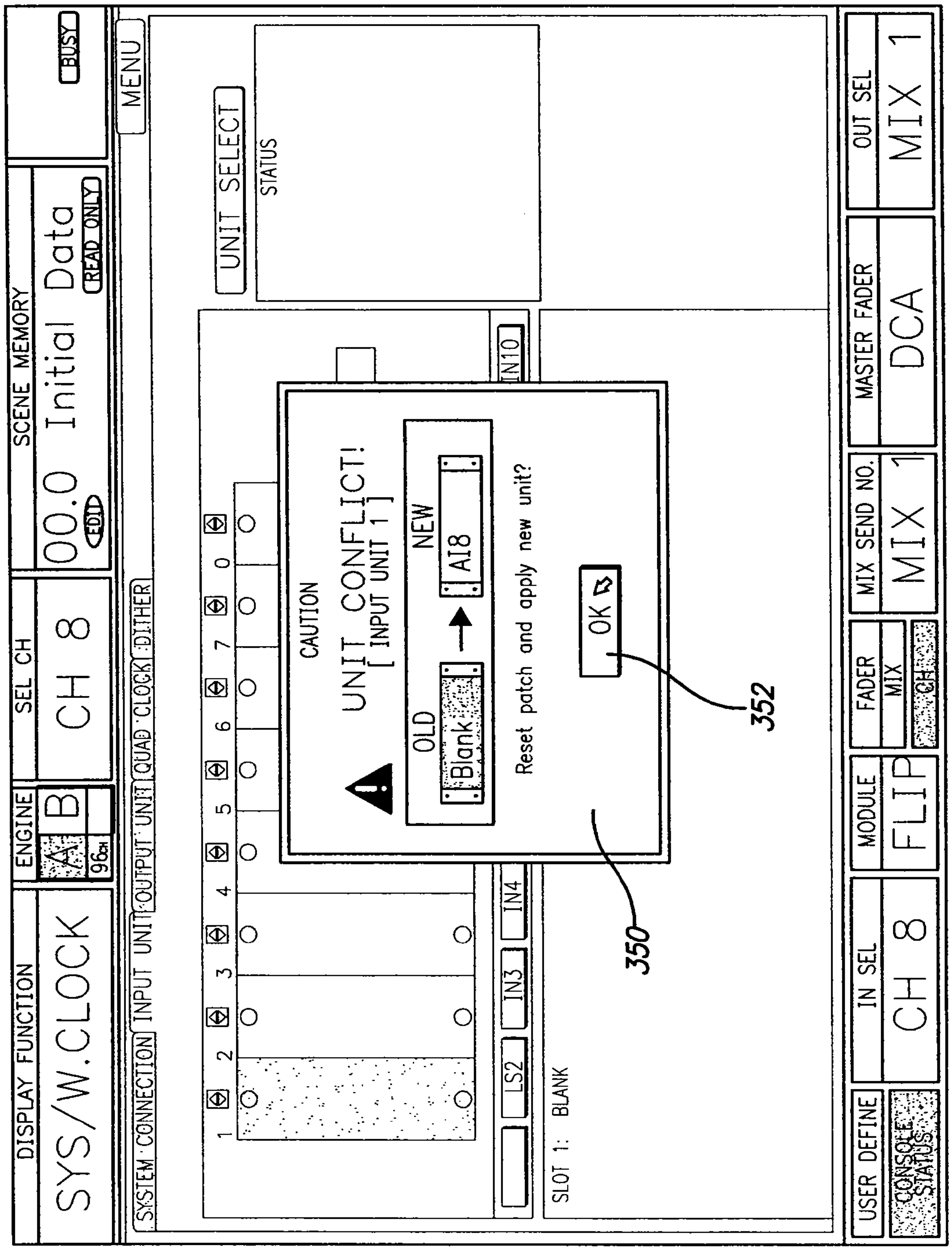
FIG. 19 shows a display example of a conflict alarm window 350.

2.1.4 Conflict Alarm Window 350 (FIG. 19)

When the operator clicks the DA unit selection button 302 using the pointing device, the conflict alarm window 350 in FIG. 19 is displayed. The window prompts the operator that the AD unit 2200 (model number AI8) is specified although no unit is connected actually. The conflict alarm window 350 contains only an OK button 352 that can be operated. When the operator clicks the OK button 352 using the pointing device, the input peripheral unit window 250 is redisplayed.

Figure 20:
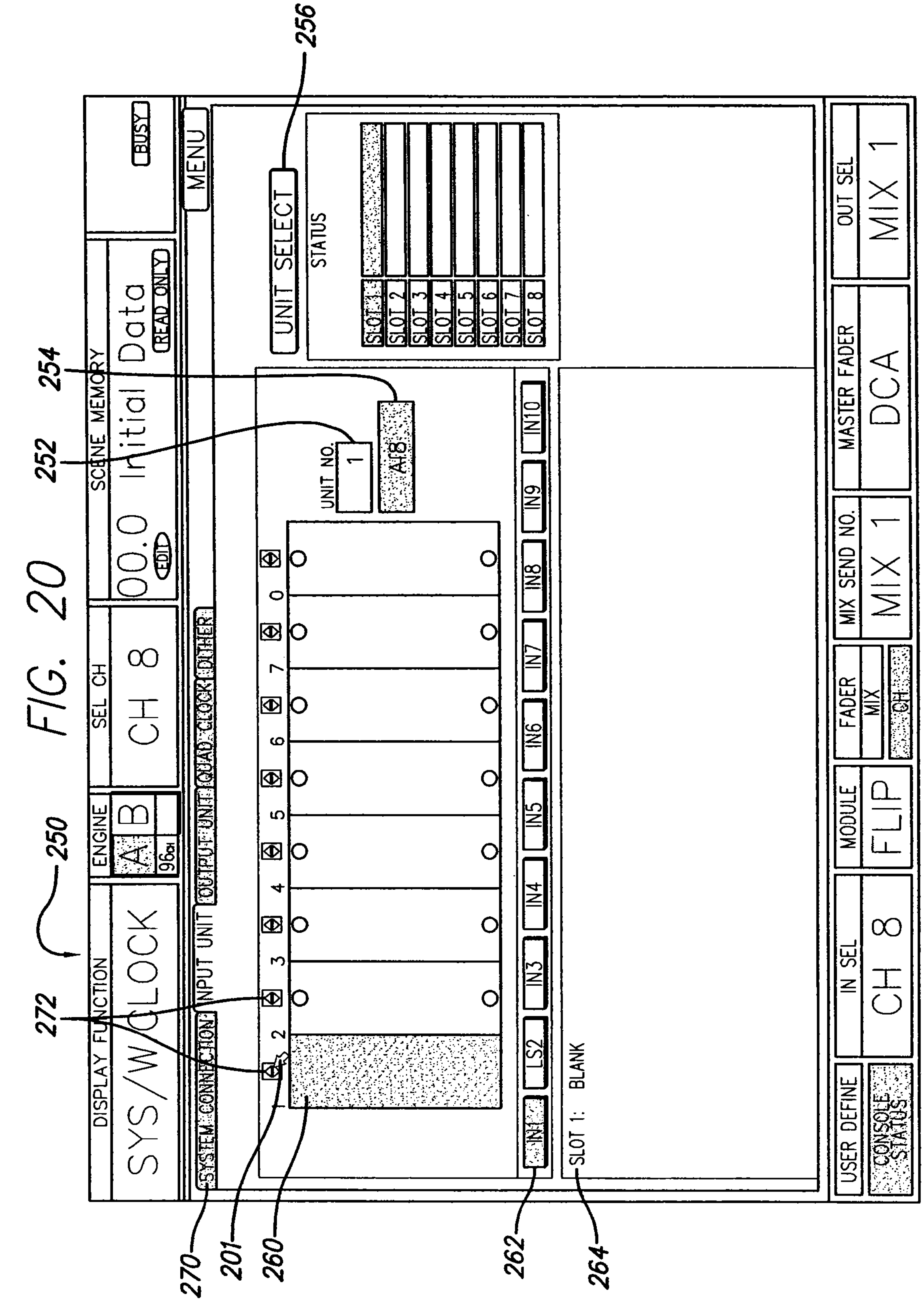
FIG. 20 shows a display example of the input peripheral unit window 250 for a real unit.

2.1.5 Input Peripheral Unit Window 250 with a Virtual Display (FIG. 20)

The input peripheral unit window 250 in FIG. 20 differs from the window in FIG. 17 in some points. First, the unit name display section 254 displays "A18" as the model number for the AD unit 2200. Since the AD unit 2200 is not actually connected, however, it is displayed as a virtual unit (gray characters on the black background).

Figure 21:
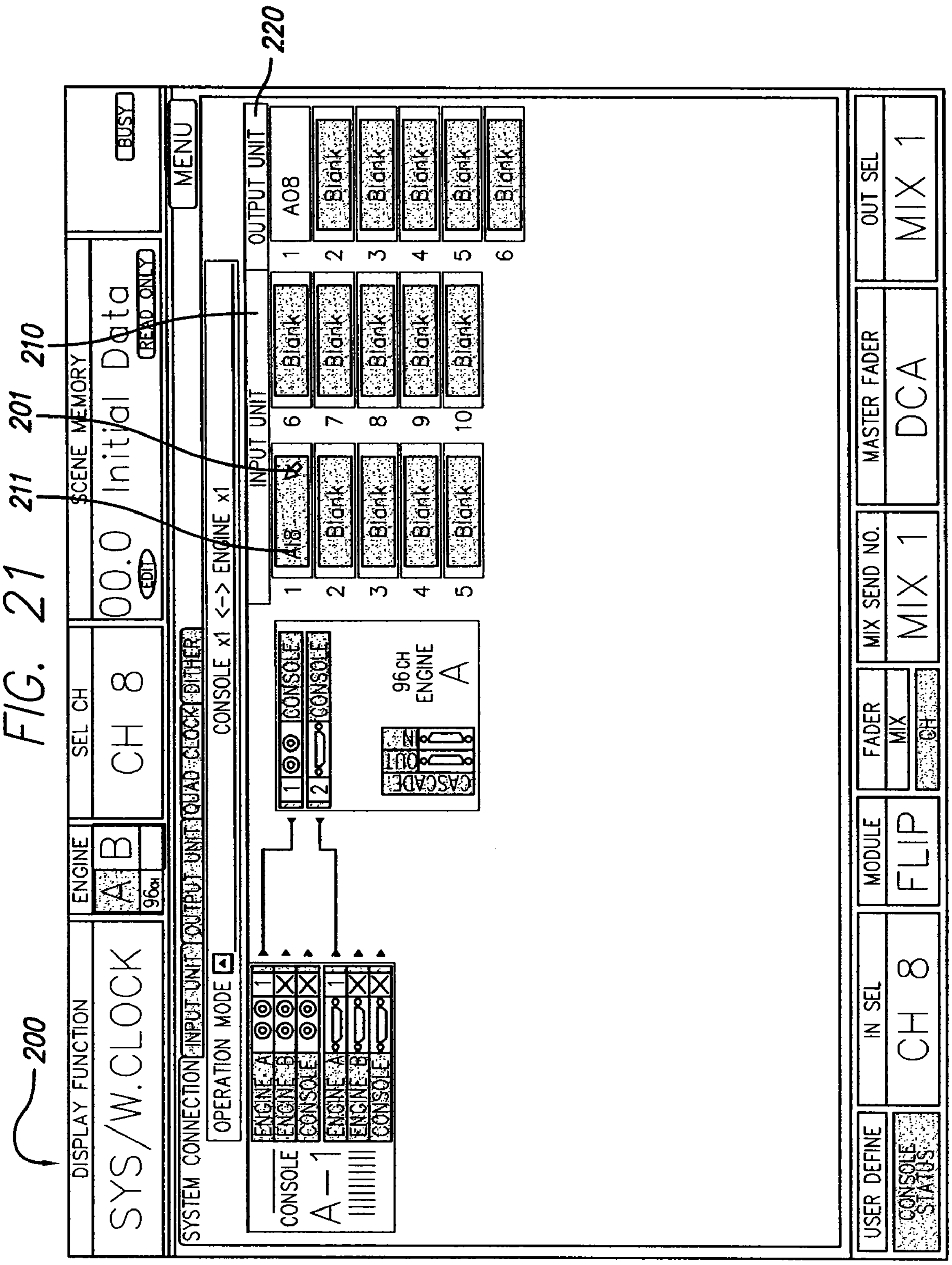
FIG. 21 shows yet another display example of the unit selection window 200.

2.1.6 Changing the Display Contents in the Unit Selection Window 200 (FIG. 21)

When the operator clicks the "SYSTEM CONNECTION" tab 270 on the input peripheral unit window 250 in FIG. 20 using the pointing device, the display device 1002 redisplays the unit selection window 200. Compared to FIG. 16, the window 200 shows that the icon 211 corresponding to the first input terminal is changed to the AD unit 2200 (model number AI8) as a virtual unit. When the operator again clicks the icon 211 using the pointing device, the display device 1002 redisplays the input peripheral unit window 250.

2.1.7 Selecting a Slot in the Input Peripheral Unit Window 250 (FIG. 20)

Even though the virtual unit is identified in FIG. 20, its unit type is determined, making it possible to specify a card that can be inserted into the unit. Namely, a virtual card can be specified. The card display section 260 is provided with slot selection switches 272, . . . , 272 at the top of each card. Before the unit type is determined, the slot selection switches 272, . . . , 272 were inactive. When the unit type is determined, the switch becomes active for specifying the virtual card.

Figure 22:
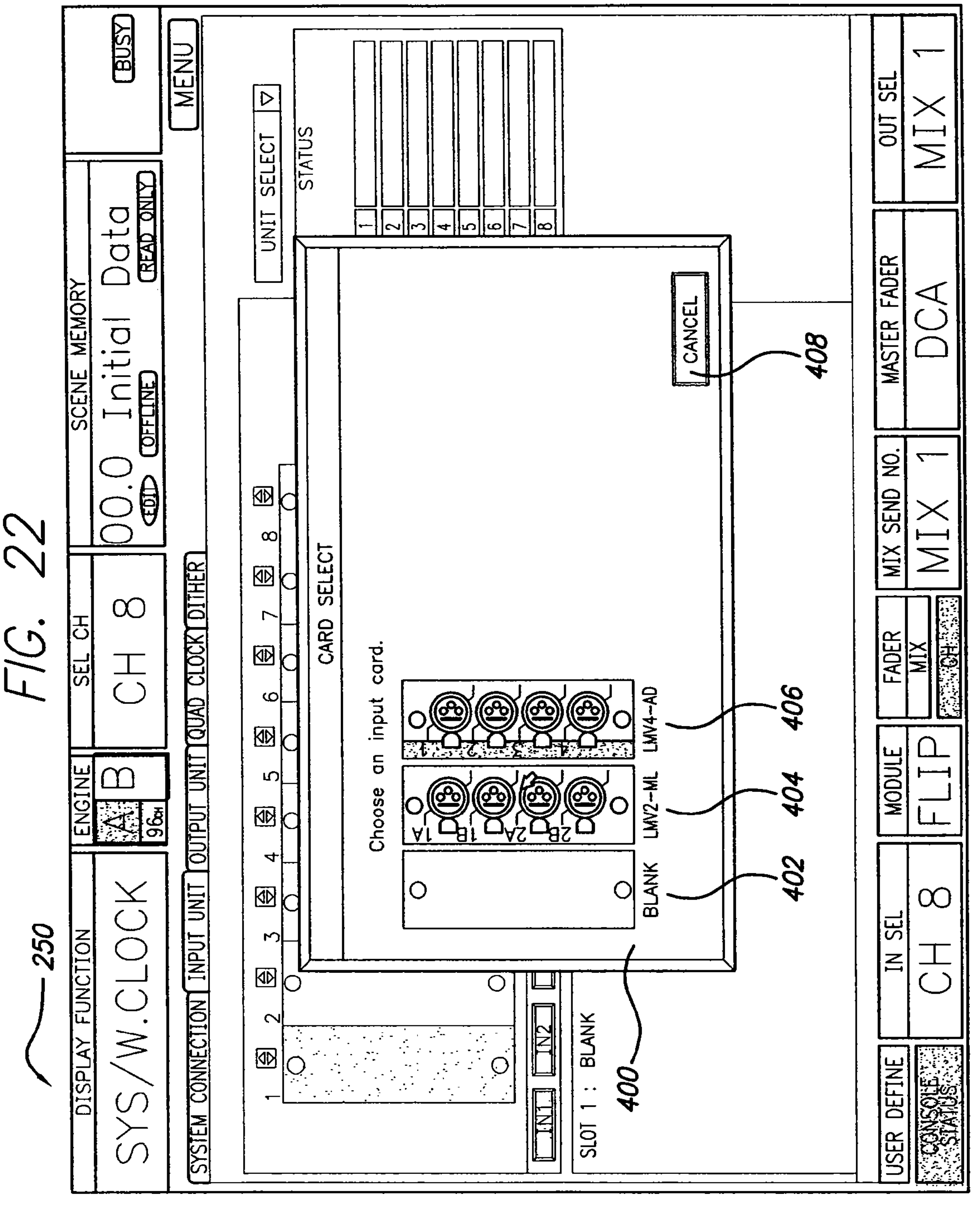
FIG. 22 shows a display example of a card selection window 400.

2.1.8 Selecting a Card in a Card Selection Window 400 (FIG. 22)

In FIG. 20, for example, the operator clicks the slot selection switch 272 corresponding to the first card using the pointing device. The corresponding card selection window 400 in FIG. 22 is displayed. The window shows icons 420, 404, and 406 representing cards that can be inserted into the AD unit 2200 (model number AI8), and a CANCEL button 408. The insertable cards include a blank card, a 2-channel microphone-level input card (model number LMY-ML), and a 4-channel line-level input card (model number LMY4-AD).

When the operator selects a card to be inserted from the card selection window 400, the unit selection window 200 reflects the selection result. For example, the operator clicks the icon 404 corresponding to the microphone-level input card (model number LMY2-ML) using the pointing device.

The card selection window 400 disappears from the display device 1002. The input peripheral unit window 250 is redisplayed as shown in FIG. 23.

Figure 23:
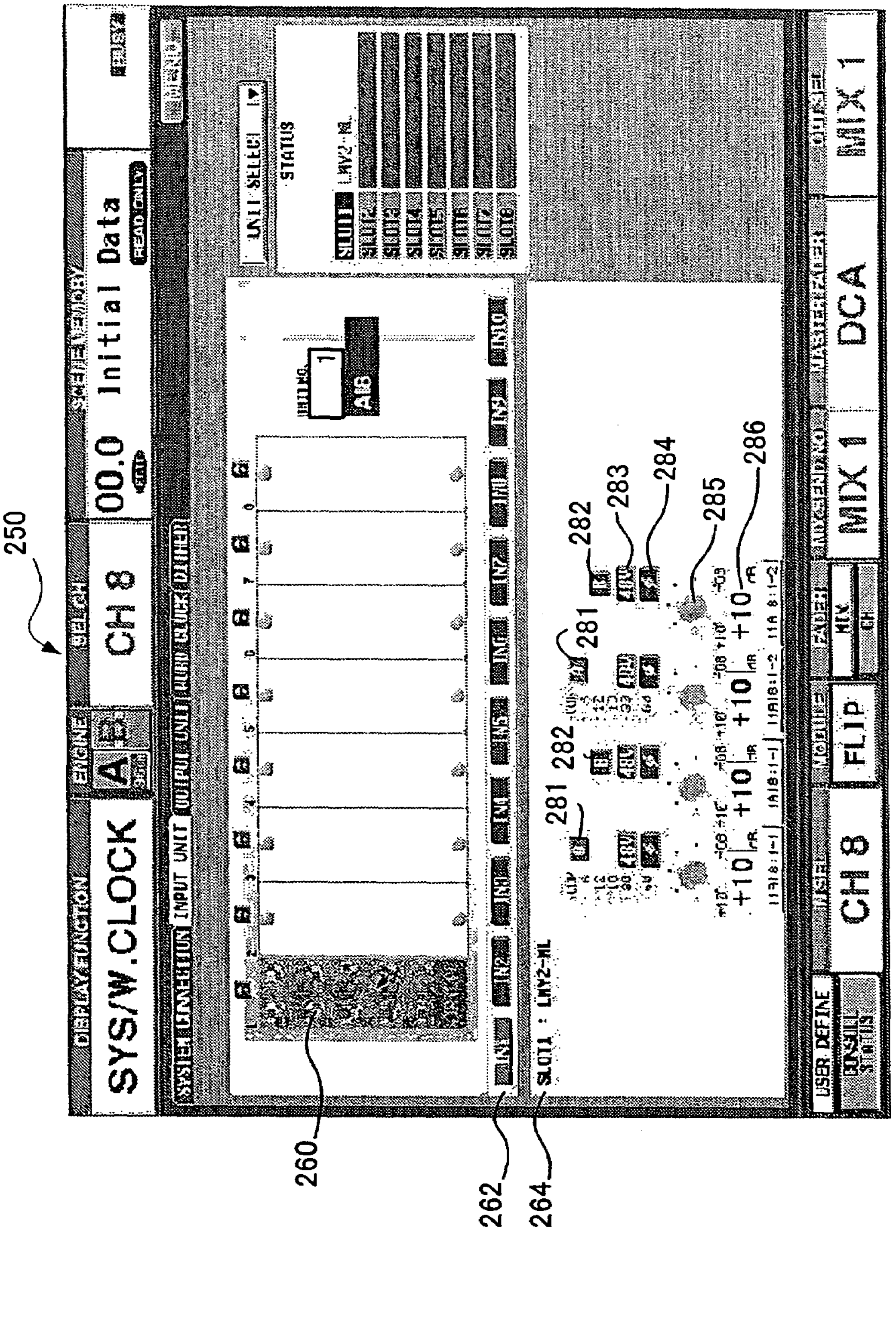
FIG. 23 shows another display example of the input peripheral unit window 250 for a virtual unit.
Figure 24:
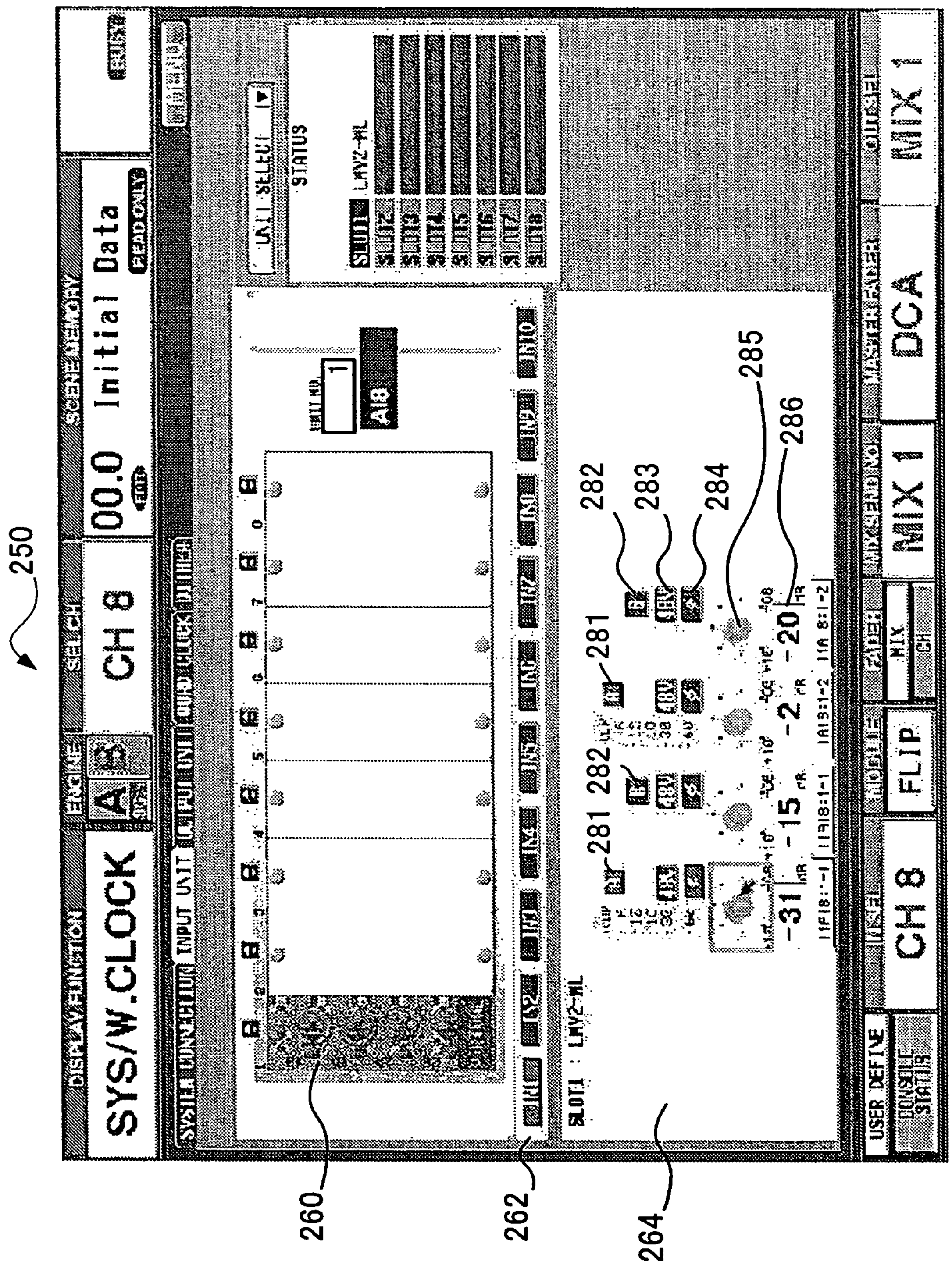
FIG. 24 shows yet another display example of the input peripheral unit window 250 for a virtual unit.

2.1.9 Setting Parameters in the Input Peripheral Unit Window 250 (FIGS. 23 and 24)

In FIG. 23, the first slot in the card display section 260 shows an image representing the microphone-level input card (model number LMY2-ML). An external configuration of this card is similar to the image. Since the card is not connected actually, i.e., it is a virtual card, a character string "VIRTUAL" is displayed at the bottom of the image. The microphone-level input card (model number LMY2-ML) uses two microphone-level analog signals referred to as microphone channels 1 and 2. Each of microphone channels 1 and 2 is provided with two cannon connector terminals A and B. Either terminal is selectable as an input terminal.

The card status display section 264 displays operation device images used to specify various parameters for the microphone-level input card (model number LMY2-ML). To specify a parameter for each operation device image, the operator moves the cursor 201 to the corresponding operation device image and performs specified operations. The reference numerals 281 and 282 denote terminal selection buttons for selecting either of terminals A and B used for the microphone channels 1 and 2. The reference numeral 283 represents a phantom power supply button provided for each of terminals 1A, 1B, 2A, and 2B. The button specifies whether or not to feed a phantom power supply (needed for a capacitor microphone etc.) to a microphone connected to the terminal.

The reference numeral 284 denotes a phase inversion button for specifying whether or not to reverse the phase of an input audio signal. A plurality of microphones may be used to pick up audio signals from the same sound source. If each microphone produces an audio signal with the phase inverted, there occurs an error such as voids in the bass range, etc. The reference numeral 285 represents a head amplifier volume control for setting amplification of the audio signal. The reference numeral 286 denotes a gain display section, which displays a gain specified by a head amplifier volume control 285 in numeric values (decibels). FIG. 24 shows a result of settings in the card status display section 264.

Figure 25:
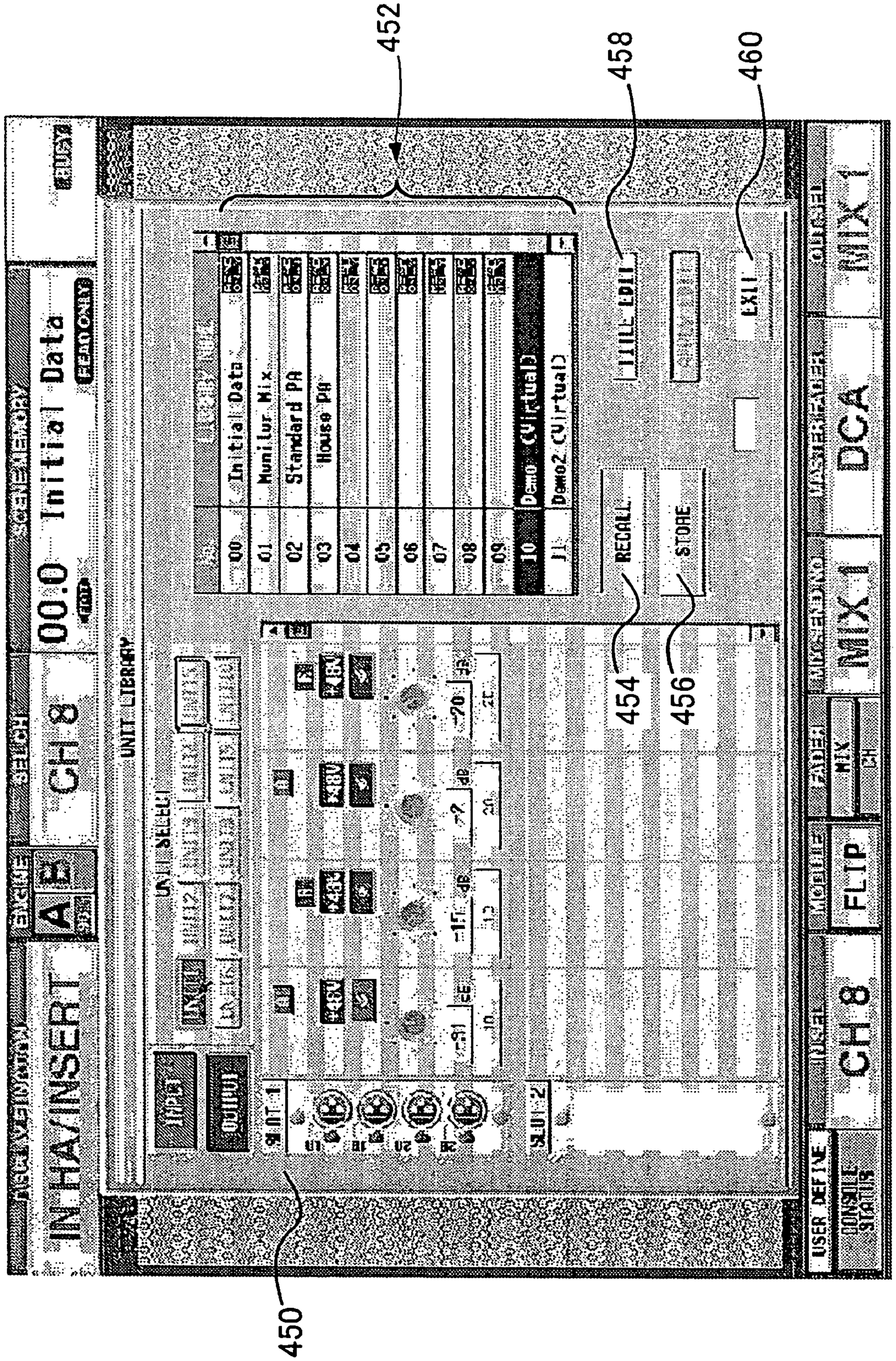
FIG. 25 shows a display example of a library window 450.

2.1.10 Library Window 450 (FIG. 25)

The display device 1002 displays a library window 450 shown in FIG. 25 according to a specified operation by the operator. In the library window 450, the reference numeral 452 denotes a library list which displays a library number and a library name of the setup content in the digital mixing system. Using the pointing device, the operator clicks any line in the library list to select the corresponding library to be processed.

After selecting the library to be processed, the operator clicks a STORE button 456 using the pointing device to store the specified content in the corresponding library of the flash memory 1020. The operator can click a RECALL button using the pointing device. Doing so sets up various parameters in the console 1000, the engine 2000, etc. based on the setup content already stored in the library. The reference numeral 458 denotes a TITLE EDIT button. Clicking this button performs processing for editing the selected library's name. The reference numeral 460 represents an EXIT button. Clicking this button closes the library window 450.

Figure 26:
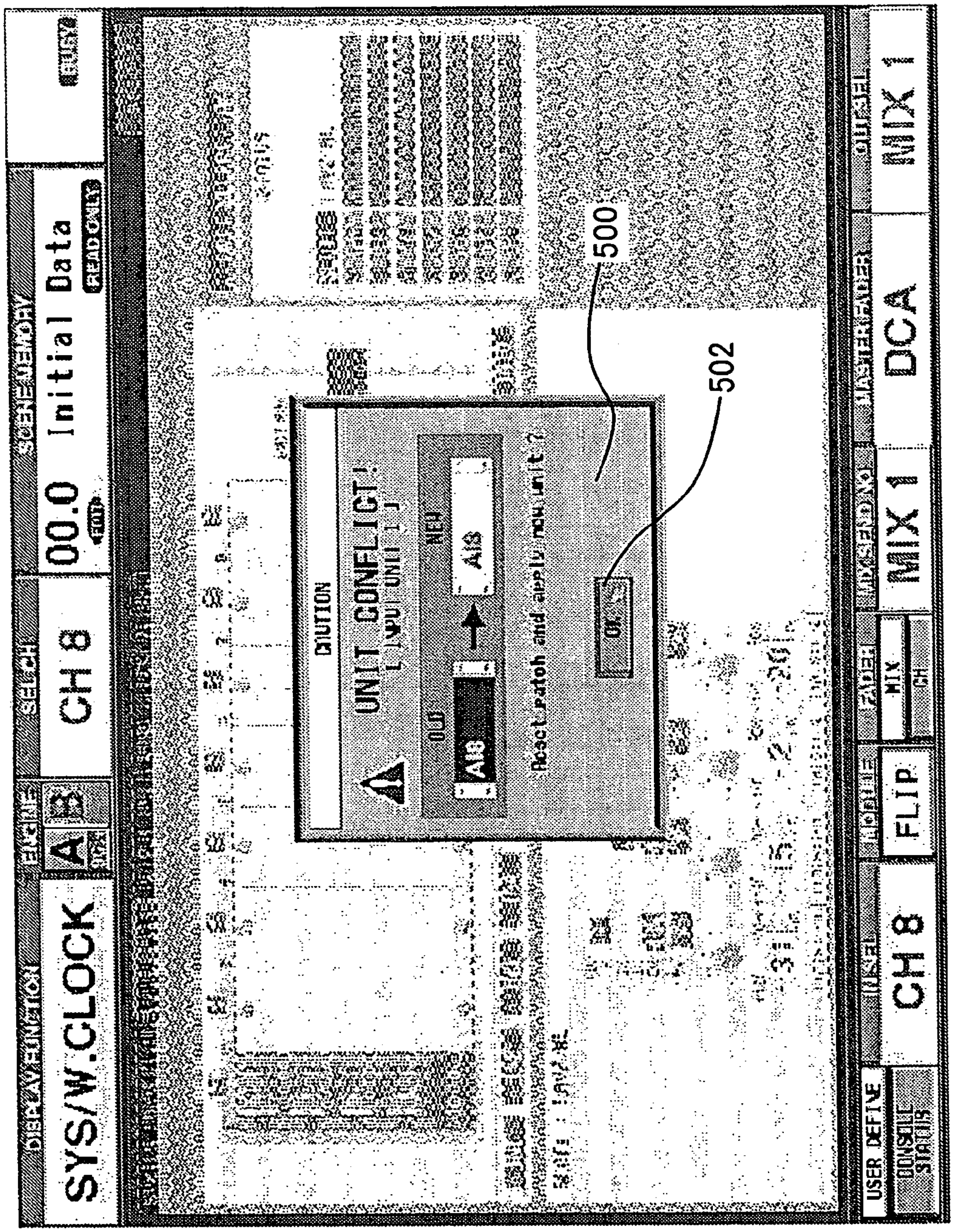
FIG. 26 shows a display example of a conflict alarm window 500 in unit disconnection.

2.1.11 Connecting a Real Unit (FIG. 26)

As mentioned above, the units 2200 through 2400 are capable of plug and play (hot plug-in) for the engine 2000. For this reason, any unit defined as a virtual unit may be actually connected to the engine 2000 while the digital mixing system is operating. In such case, a conflict alarm window 500 in FIG. 26 is displayed. The window prompts the operator that the current unit is connected in place of the first input peripheral unit that should be defined as a virtual unit.

The conflict alarm window 500 contains only an OK button 502 that can be operated. When the operator clicks the OK button 502 using the pointing device, the conflict alarm window 500 closes. Even if a "conflict" occurs, it is just caused by a nominal difference between the "virtual unit" and the "real unit". The unit's model number causes no actual conflict. For this reason, only the OK button is operable.

Figure 13:
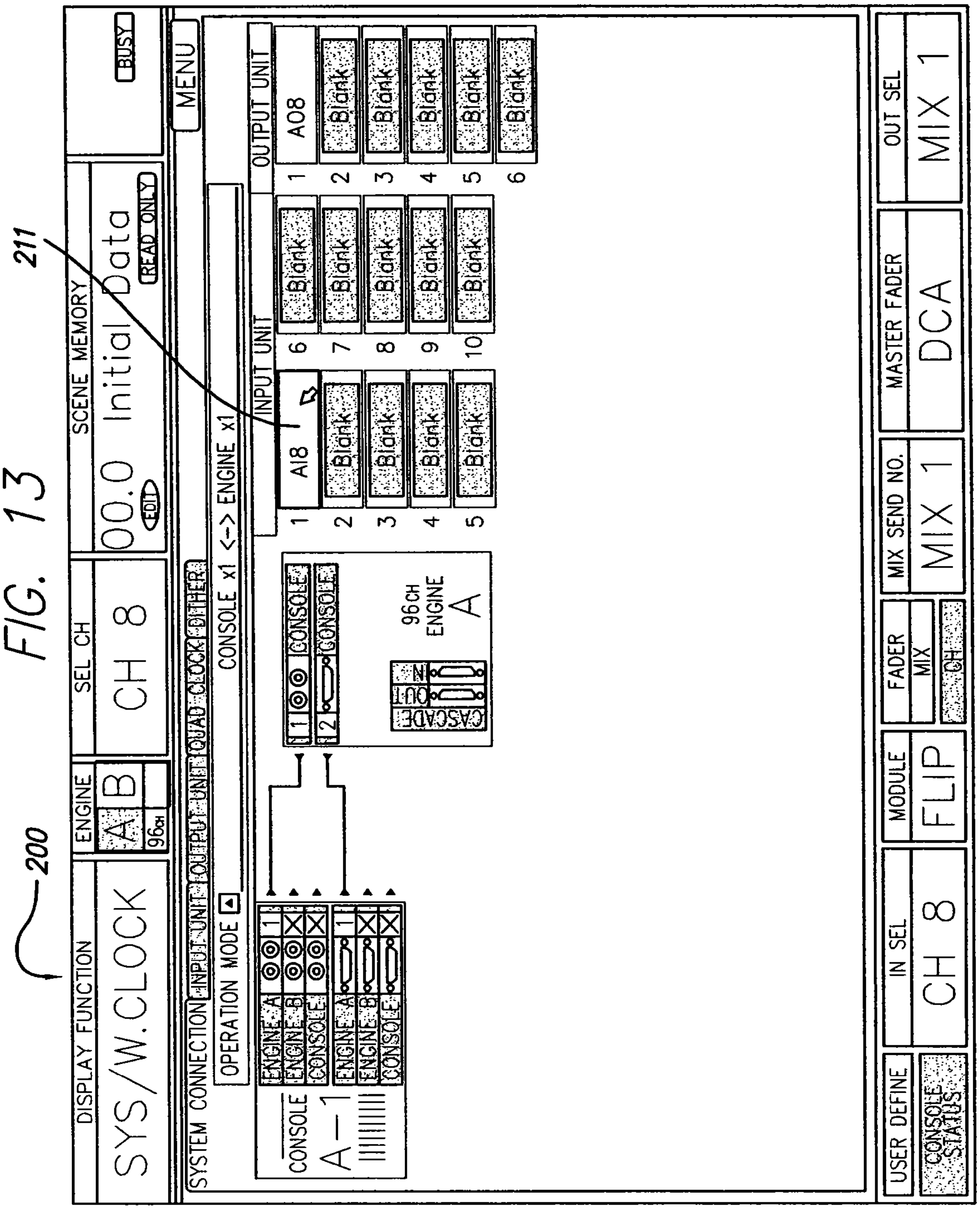
FIG. 13 shows a display example of a unit selection window 200.

2.1.12 Activating the Real Unit in the Unit Selection Window 200 (FIG. 13)

The unit corresponding to the first input terminal has been changed to the real unit from the virtual unit. When the unit selection window 200 is displayed thereafter, it changes as shown in FIG. 13. Namely, the icon 211 corresponding to the first input terminal is represented with "gray characters on the white background" indicating the real unit.

2.1.13 Activating the Real Unit in the Input Peripheral Unit Window 250 (FIG. 14)

Clicking the icon 211 in FIG. 13 by using the pointing device displays the input peripheral unit window 250 for the corresponding unit as mentioned above. Since the icon 211 is changed to the real unit, the input peripheral unit window 250 reflects the state of the actual AD unit 2200 (model number AI8). After the specified unit becomes the real unit, the unit name display section 254 also changes to "gray characters on the white background".

FIG. 14 shows a display example of the input peripheral unit window 250 for the real unit. In the card display section 260 of the figure, the first to fourth slots indicate microphone-level input cards (model number LMY2-ML). The fifth to eighth slots indicate line-level input cards (model number LMY4-AD). There are no cards indicating "VIRTUAL" in FIG. 14. Namely, the cards as indicated in this window are actually inserted into the AD unit 2200.

According to the state as shown in the figure, the first slot is selected in the card display section 260. The card status display section 264 shows parameters for the microphone-level input card (model number LMY2-ML) that is inserted into the first slot. The parameters set for the card correspond to those set for the virtual card in the virtual unit, i.e., those indicated in the card status display section 264 in FIG. 24.

According to the embodiment, when a real unit or a real card with the same model number as the virtual unit or card is connected, parameters set for the virtual unit or virtual card are unchangingly used as parameters for the corresponding real unit or real card. In FIG. 24, parameters are specified only for the virtual card at the first slot. No parameters are specified explicitly for the other slots (second to eighth). In such case, default parameters are taken for the cards inserted into these slots. The "default" state means, e.g., that the gain is fully decreased on the microphone-level input card (model number LMY2-ML).

Figure 15:
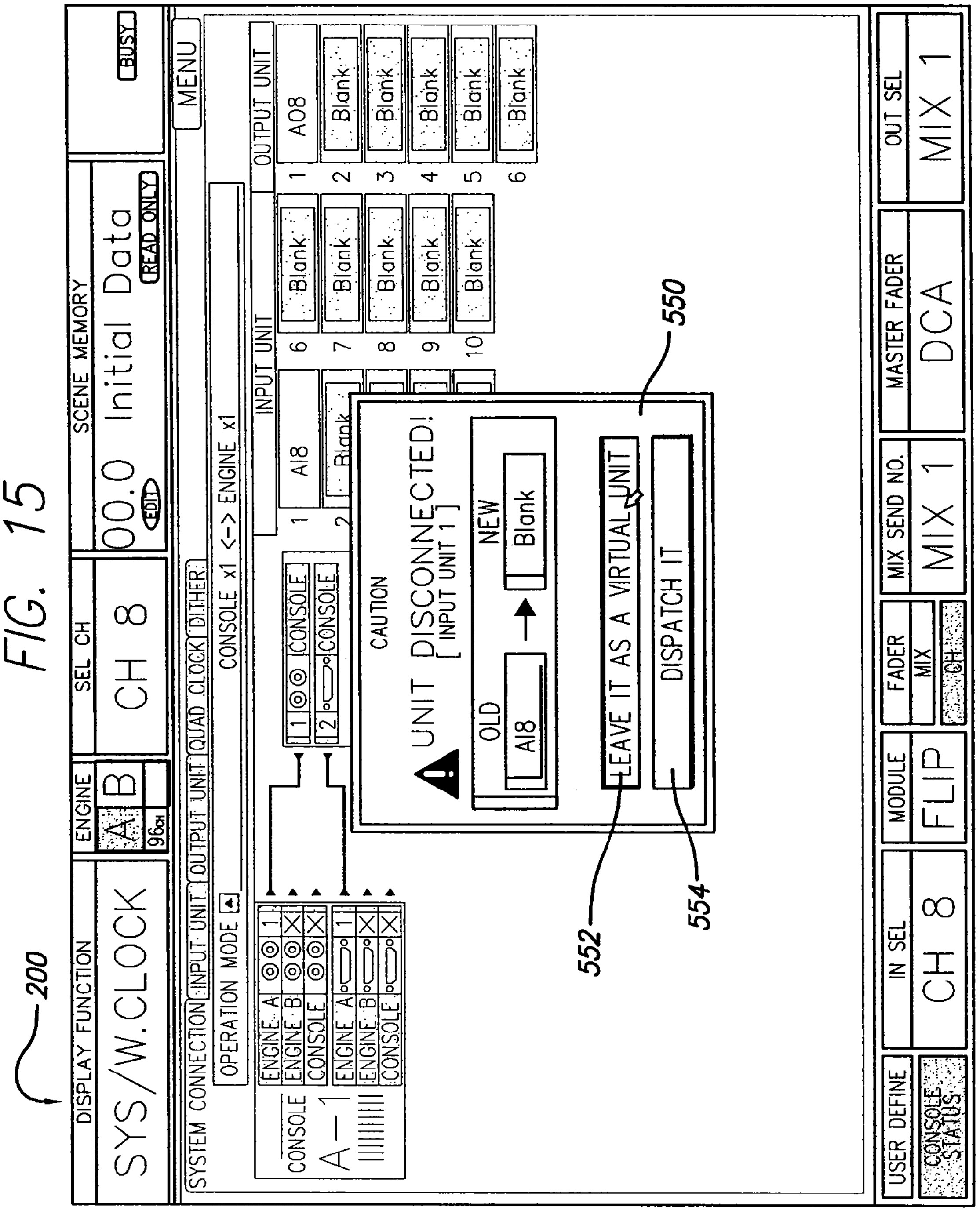
FIG. 15 shows a display example of a disconnection alarm window 550.

2.1.14 Processes when the Real Unit is Disconnected (FIG. 15)

When the AD unit 2200 (model number AI8) defined to be the real unit is disconnected, the display device 1002 displays a disconnection alarm window 550 in FIG. 15. This window warns the operator that the AD unit 2200 (model number AI8) defined to be the real unit has been disconnected. The window contains two buttons 552 and 554.

The button 552 specifies that the disconnected unit should remain as the virtual unit. The button 554 specifies that the disconnected unit should be deleted. When the operator clicks the button 552 using the pointing device, the unit selection window 200 returns to the state in FIG. 21. Clicking the button 554 returns the unit selection window 200 to the state in FIG. 16.

Figure 8:
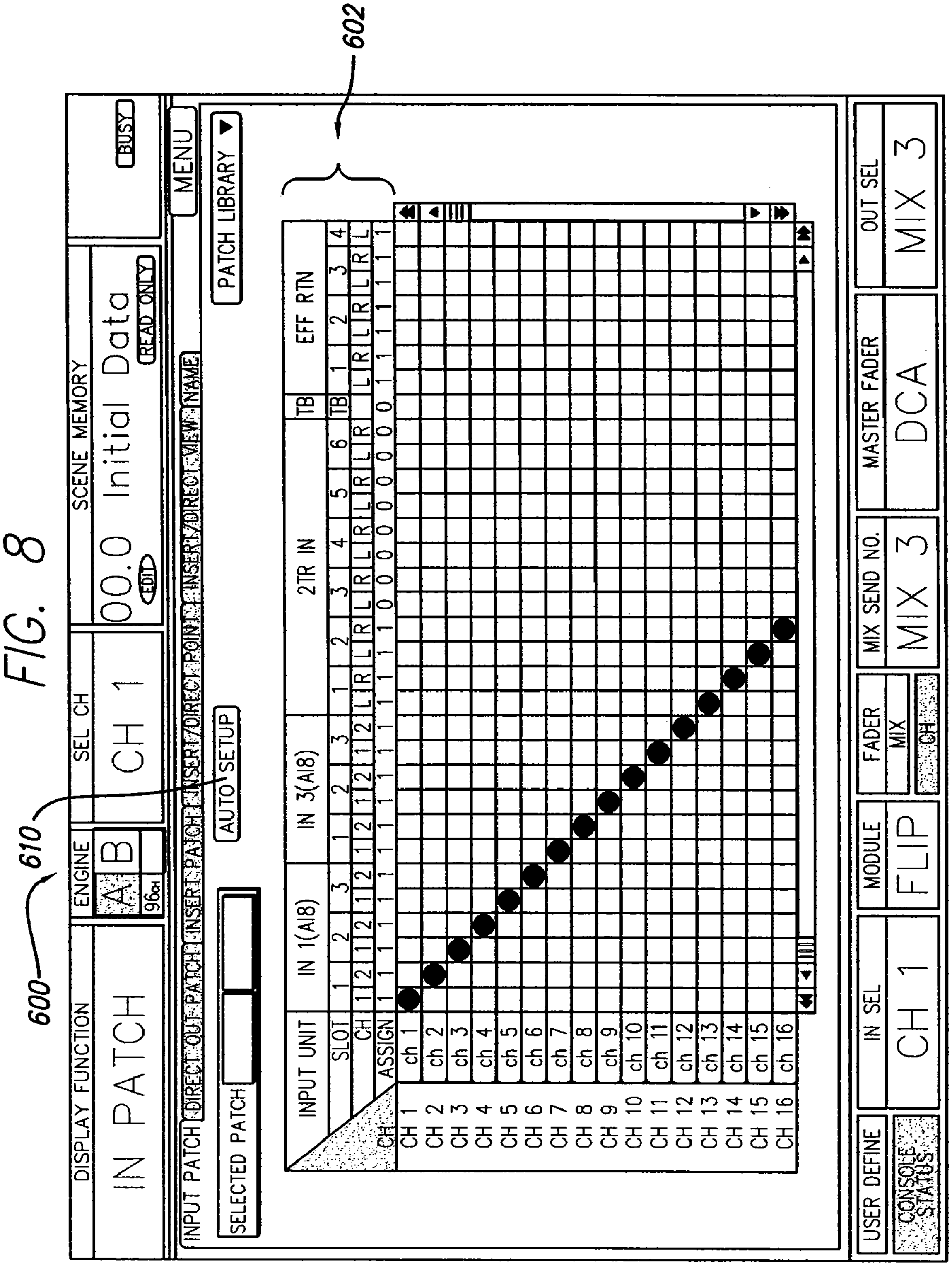
FIG. 8 shows a display example of an input patch display/setup window 600.

2.1.15 Displaying and Setting the Input Patch Section 112 (FIG. 8)

When the operator performs a specified operation, the display device 1002 displays an input patch display/setup window 600 in FIG. 8. The window 600 displays the setup contents in the input patch section 112. The figure contains a matrix comprising physical input channels (columns) and logical input channels (rows) in the input channel adjustment sections 114 and 116. For example, a vertical title section 602 shows "IN 1 (AI8)" at the left end. This means that the AD unit 2200 (model number AI8) is connected to the first input terminal of the engine 2000 or that the unit is scheduled to be connected and is defined as a virtual unit.

Numbers "1", "2", and "3" are displayed immediately below "IN 1 (AI8)". This indicates that some cards are inserted into the slots 1 through 3 of the unit or that some virtual cards are defined. Immediately below these numbers, there are arranged three sets of numbers "1" and "2". These numbers indicate physical input channels of the card. Since one card has two input channels, it is understood that the card is a microphone-level input card (model number LMY2-ML).

Further, there is indicated "IN 3 (AI8)" to the right of the "IN 1 (AI8)". This means that the AD unit 2200 (model number AI8) is connected to the third input terminal of the engine 2000 or is defined to be a virtual unit. Also in the unit for the third input terminal, the cards (i.e., model number LMY2-ML) each having two input channels are inserted into the first to third slots or are defined to be virtual cards.

Each row in the input patch display/setup window 600 sequentially corresponds to each input channel of the monophonic input channel adjustment section 114 and each input channel of the stereophonic input channel adjustment section 116. The input channels in the input channel adjustment sections 114 and 116 are referred to as "logical channels". A circle is appropriately placed at an intersection between each row and column in the window 600. This means that a physical channel in the column corresponding to the circle is assigned as an input channel in the row corresponding to the circle. The matrix in the window 600 displays the setup state of the input patch section 112.

According to the example in the figure, the channels for two AD units 2200 (model number AI8) connected to the first and third input terminals of the engine 2000 are assigned to the first through twelfth logical channels in the monophonic input channel adjustment section 114. The operator can specify the correspondence between physical and logical channels by clicking any intersection on the matrix using the pointing device.

Figure 9:
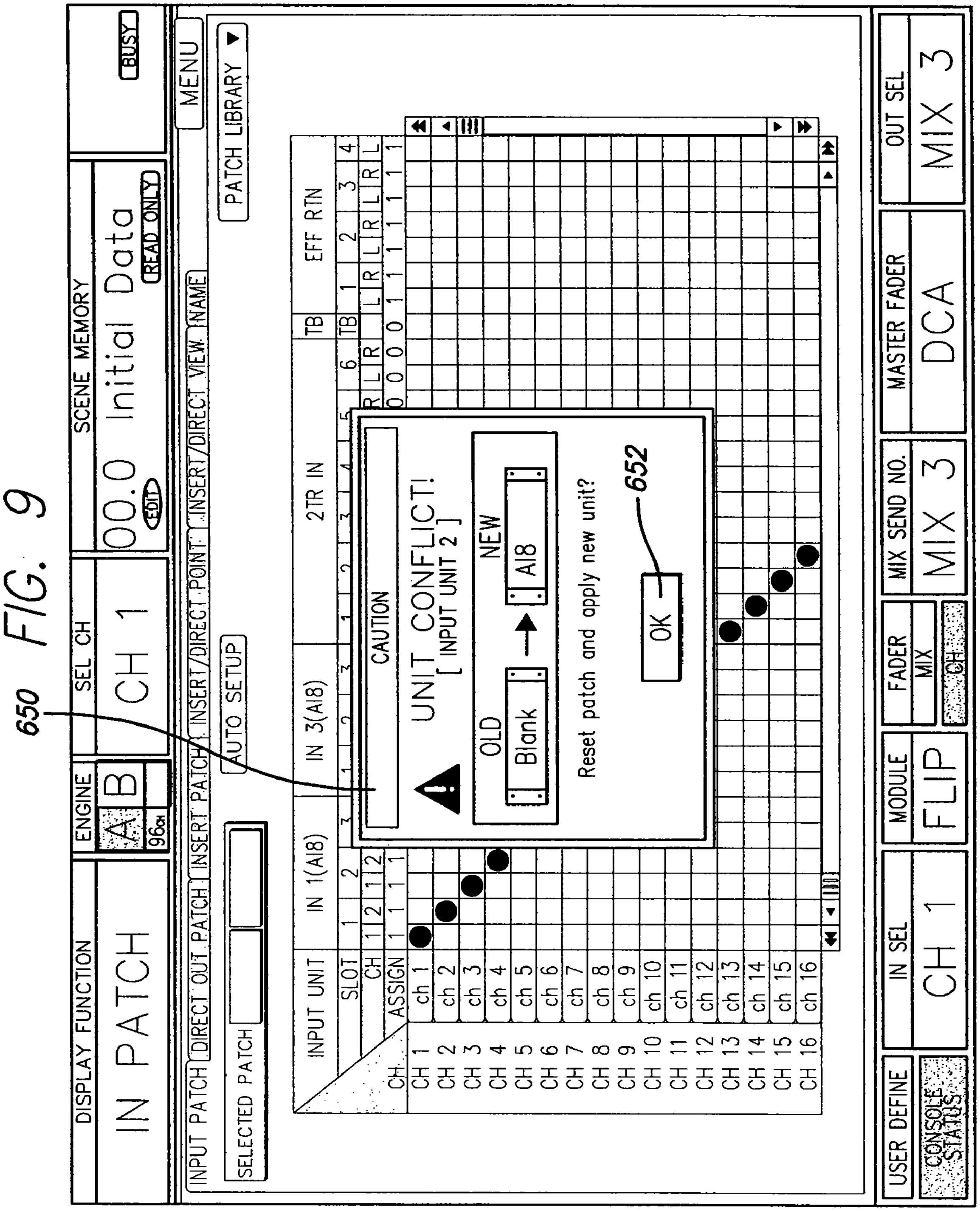
FIG. 9 shows a display example of a conflict alarm window 650.
Figure 10:
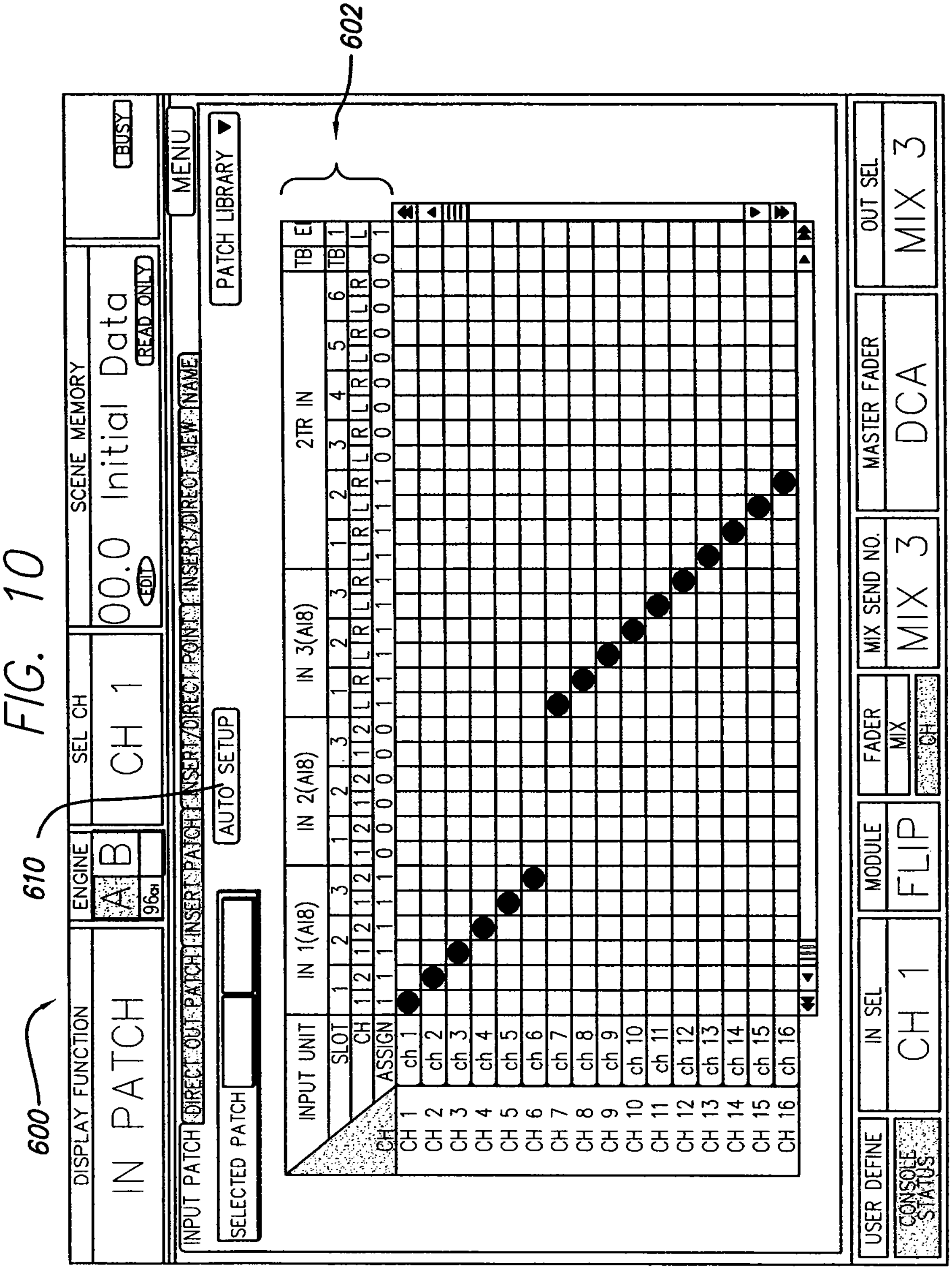
FIG. 10 shows a display example of an input patch display/setup window 600 when a new peripheral unit is added.

2.1.16 Inserting a Real Unit (FIGS. 9 and 10)

When a new input peripheral unit is connected, the display device 1002 displays a conflict alarm window 650 as shown in FIG. 9. The example in the figure warns the operator that the new AD unit 2200 (model number AI8) has been connected to the second input terminal where no unit was connected and was not scheduled to connect a virtual unit. The window 650 contains only an OK button 652 that can be operated. When the operator clicks the OK button 652 using the pointing device, the window 600 reflects the contents of the new input peripheral unit.

FIG. 10 shows an example of the updated input patch display/setup window 600. In this figure, the vertical title section 602 shows "IN 2 (AI8)" added between "IN 1 (AI8)" and "IN 3 (AI8)". The added item corresponds to the AD unit 2200 (model number AI8) newly connected to the second input terminal. This shows that the cards (i.e., model number LMY2-ML) each having two input channels are also inserted into the first to third slots of the unit. However, the state in the figure indicates no change in the correspondence between physical and logical channels. Namely, no correspondence is made between physical and logical channels for the newly connected input peripheral unit.

2.1.17 Setting Parameters in an Input Channel Setup Window 750

Figure 27:
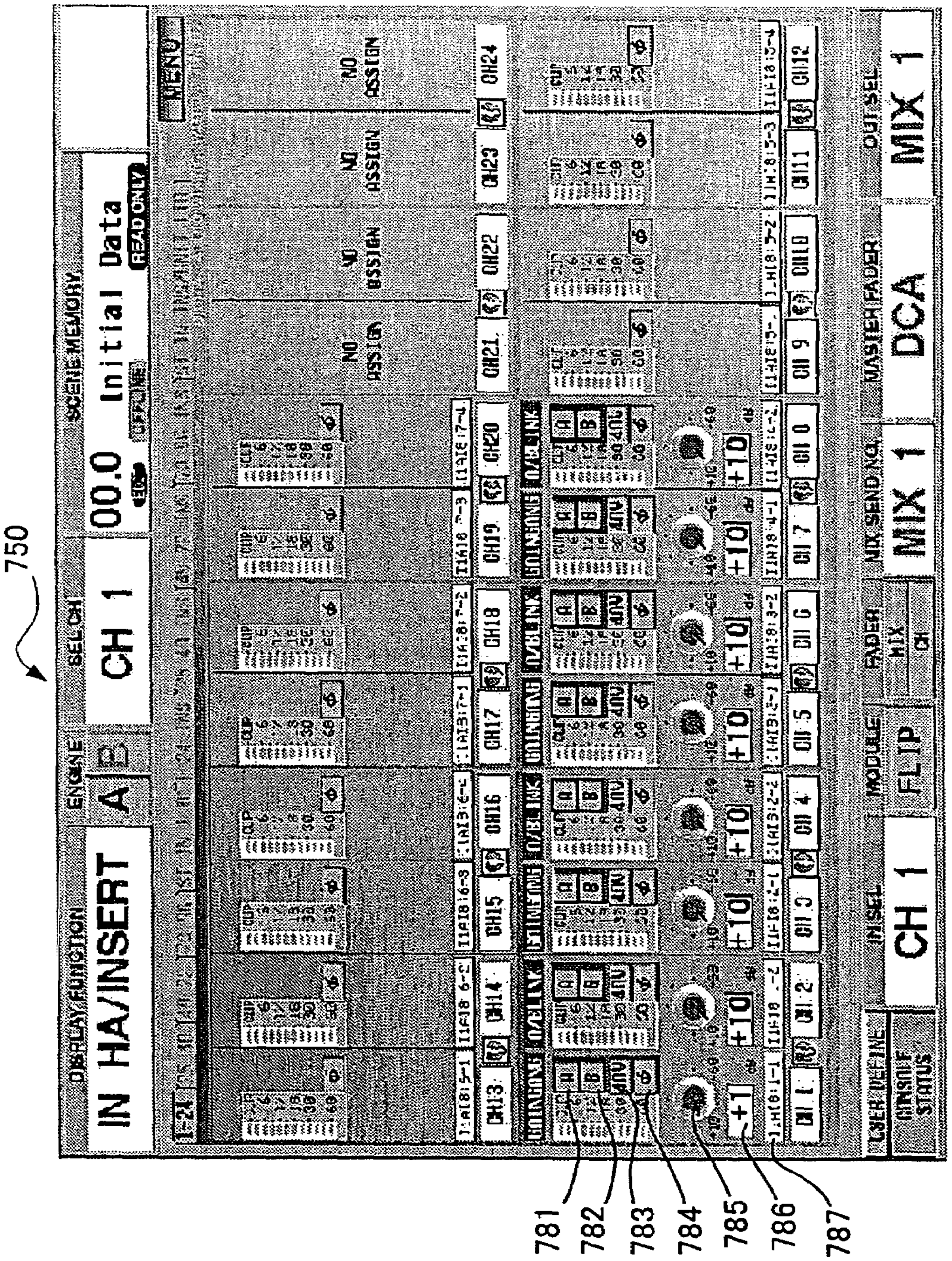
FIG. 27 shows a display example of an input channel setup window 750.

When the operator performs a specified operation, the display device 1002 displays the input channel setup window 750 for logical channels in the input channel adjustment sections 114 and 116. FIG. 27 shows an example. As mentioned above, the input peripheral unit window 250 (FIGS. 23 and 24) can be used to specify parameters for cards in the input/output peripheral units. Further, input channel setup window 750 can be also used to configure cards identified as logical channels in the input channel adjustment sections 114 and 116.

In FIG. 27, for example, the window displays elements for input channel settings in the order of input channel numbers (CH1, CH2, CH3, and so on). In this example, channels CH1 through CH8 are associated with microphone-level input cards. Each channel contains terminal selection buttons 781 and 782, a phantom power supply button 783, a phase inversion button 784, a head amplifier volume control 785, and a gain display section 786 similar to the constituent elements 281 through 286 in FIG. 23.

Accordingly, the operator can set up parameters without knowing the correspondence between logical and physical channels. The card display section 787 specifies a physical channel associated with the logical channel. For example, the card display section 787 displays "I1A8:1-1" for CH1. This signifies the first channel for the card inserted into the first slot of the AD unit 2200 (model number AI8) connected to the first input terminal.

Figure 11:
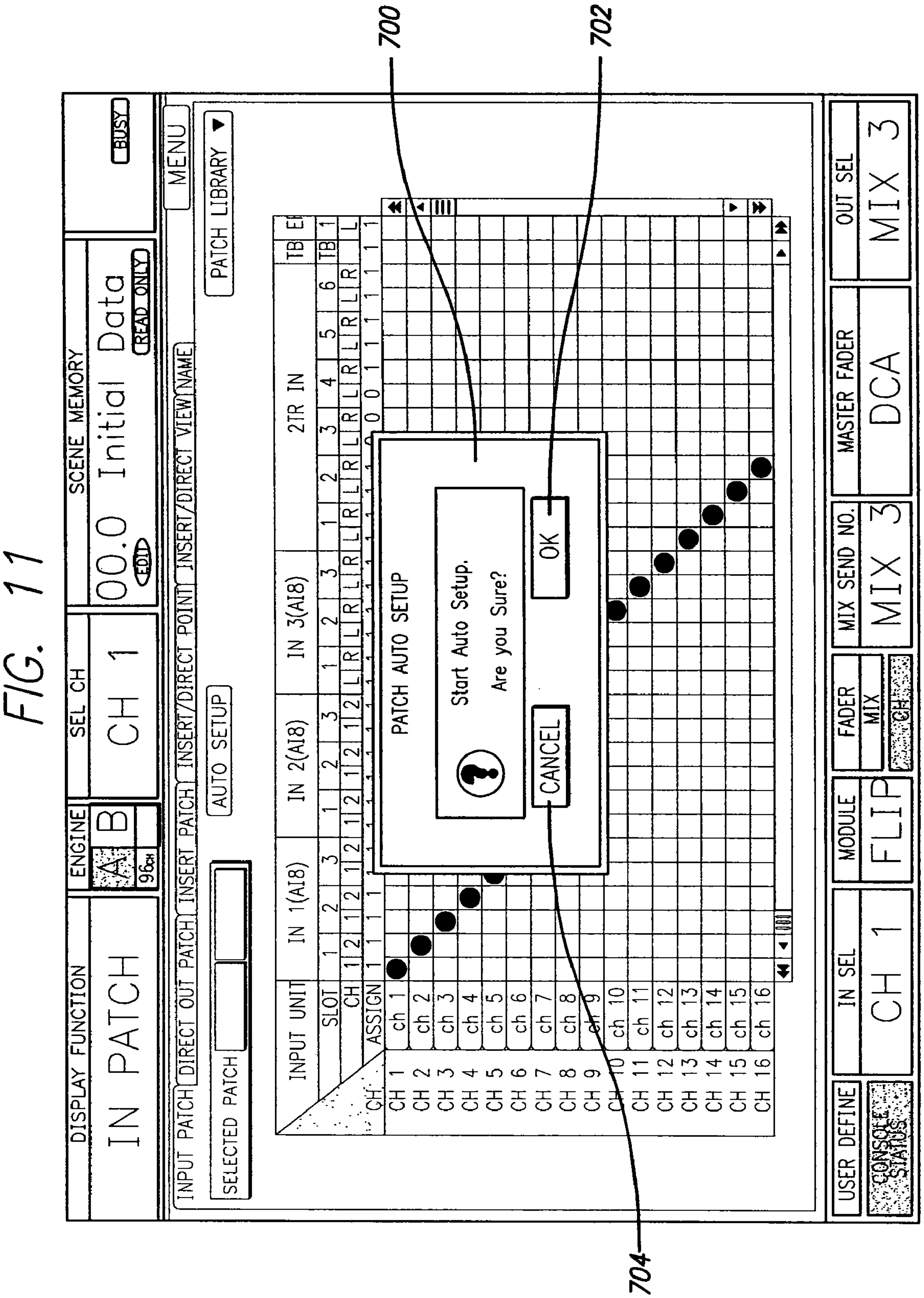
FIG. 11 shows a display example of an "AUTO SETUP" confirmation window 700.
Figure 12:
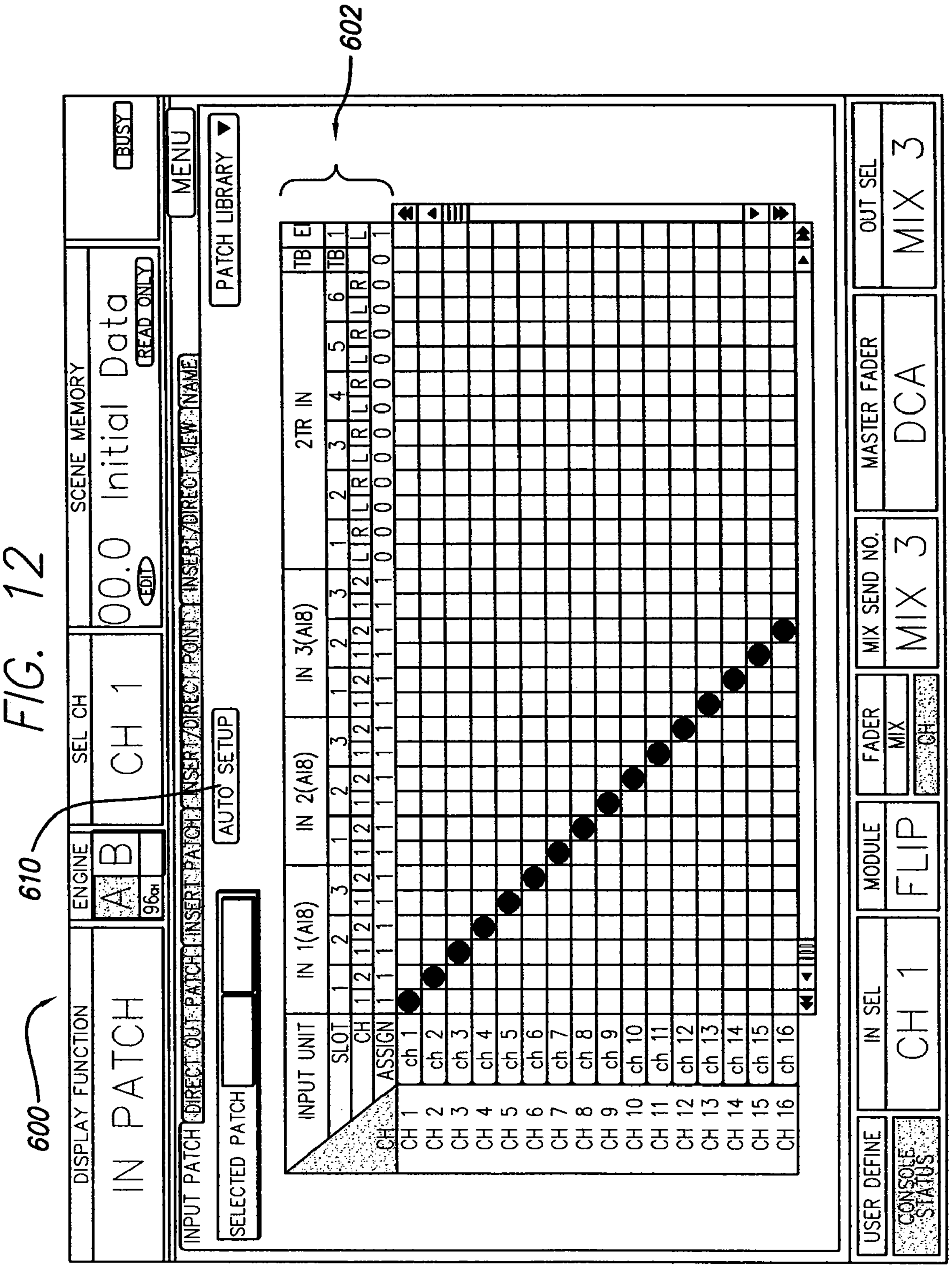
FIG. 12 shows a display example of the input patch display/setup window 600 after "AUTO SETUP" is executed.

2.1.18 Auto-Setup Operations (FIGS. 11 and 12)

In FIG. 10, the input patch display/setup window 600 includes an "AUTO SETUP" button 610. This button is used to modify the correspondence between logical and physical channels so that circles in the matrix will line up slantwise. However, 8-channel audio signals returned from the built-in effector 108 are modified so that they sequentially correspond to 4×2 channel inputs in the stereophonic input channel adjustment section 116. When the operator clicks the "AUTO SETUP" button 610 using the pointing device, the display device 1002 displays an "AUTO SETUP" confirmation window 700.

This window inquires of the operator whether or not to actually execute "AUTO SETUP". The window contains only an OK button 702 and a CANCEL button that can be operated. When the operator clicks the CANCEL button using the pointing device, the "AUTO SETUP" is canceled. The display on the display device 1002 returns to the state in FIG. 10. When the operator clicks the OK button 702, the "AUTO SETUP" is executed. The input patch display/setup window 600 is changed as shown in FIG. 12.

In FIG. 12, the correspondence is modified or rearranged so that circles in the matrix line up slantwise. Namely, the input peripheral units are arranged in the order of the connected input terminals from the left. In each input peripheral unit, the physical channels are arranged in the organized order of the slot numbers and the input channel numbers of the card. No change is made to the arrangement of the logical channels corresponding to the respective rows. When there are channels in the three AD units 2200 (model number AI8) connected to the first to third input terminals, these channels are sequentially associated with the first to eighth logical channels.

2.1.10 Simulation on Personal Computers 1106 and 2106

While the above-mentioned operations are performed on the console 1000, they can be executed on a personal computer. To do this, an application program simulating operations of the console 1000 is installed on personal computers 1106 and 2106. The personal computers do not always need to be connected to the console 1000 or the engine 2000.

If the personal computer is not connected to the console 1000 however, units 2200 through 2400 cannot be actually connected to the personal computer. In such a case, appropriate parameters should be specified so as to identify these units to be virtual units and virtual cards.

Figure 5:
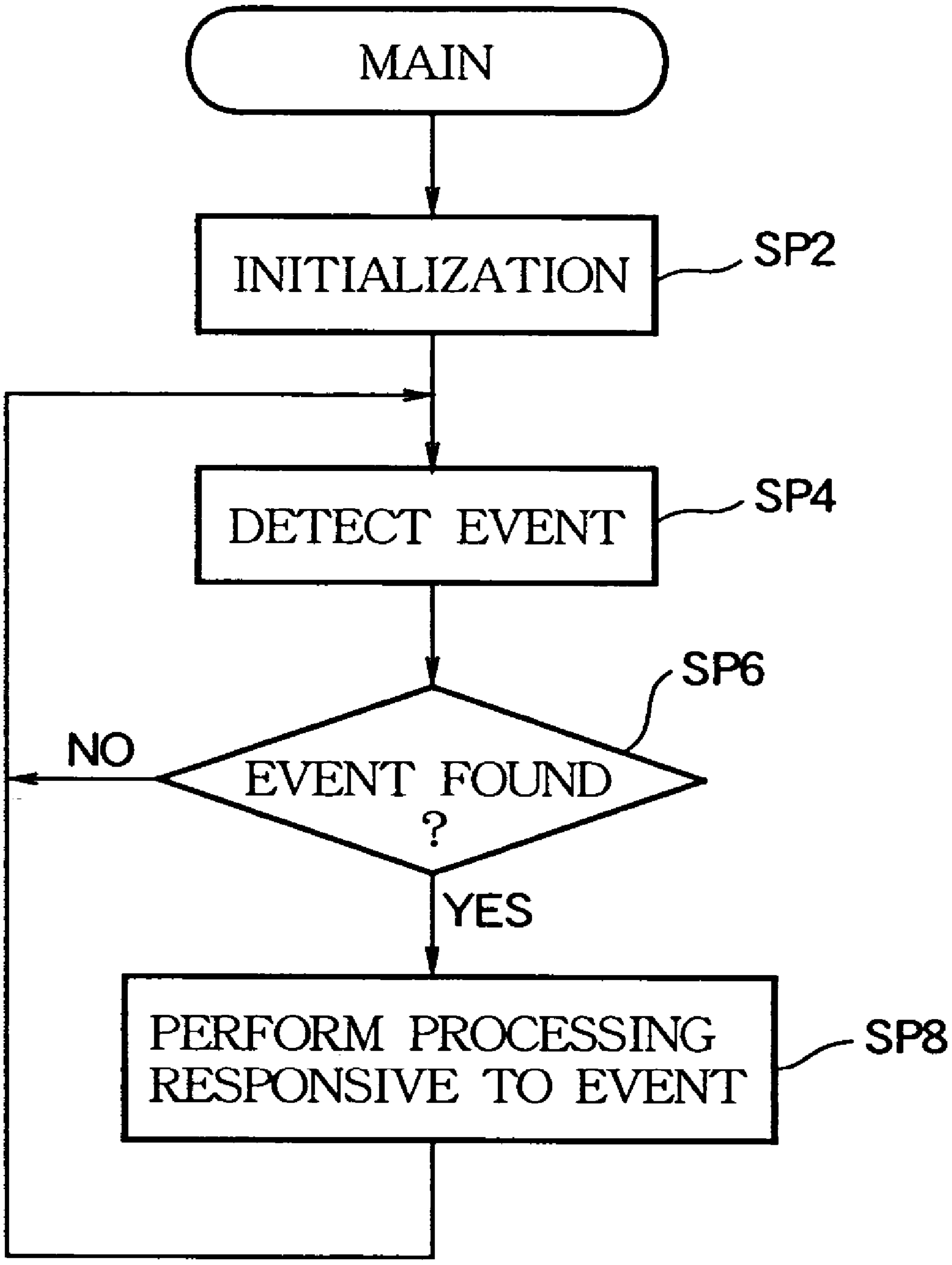
FIG. 5 is a flowchart of a main routine executed on the console 1000 or a personal computer 2106.

2.2 Program Details 2.2.1 Main Routine (FIG. 5)

Figure 6:
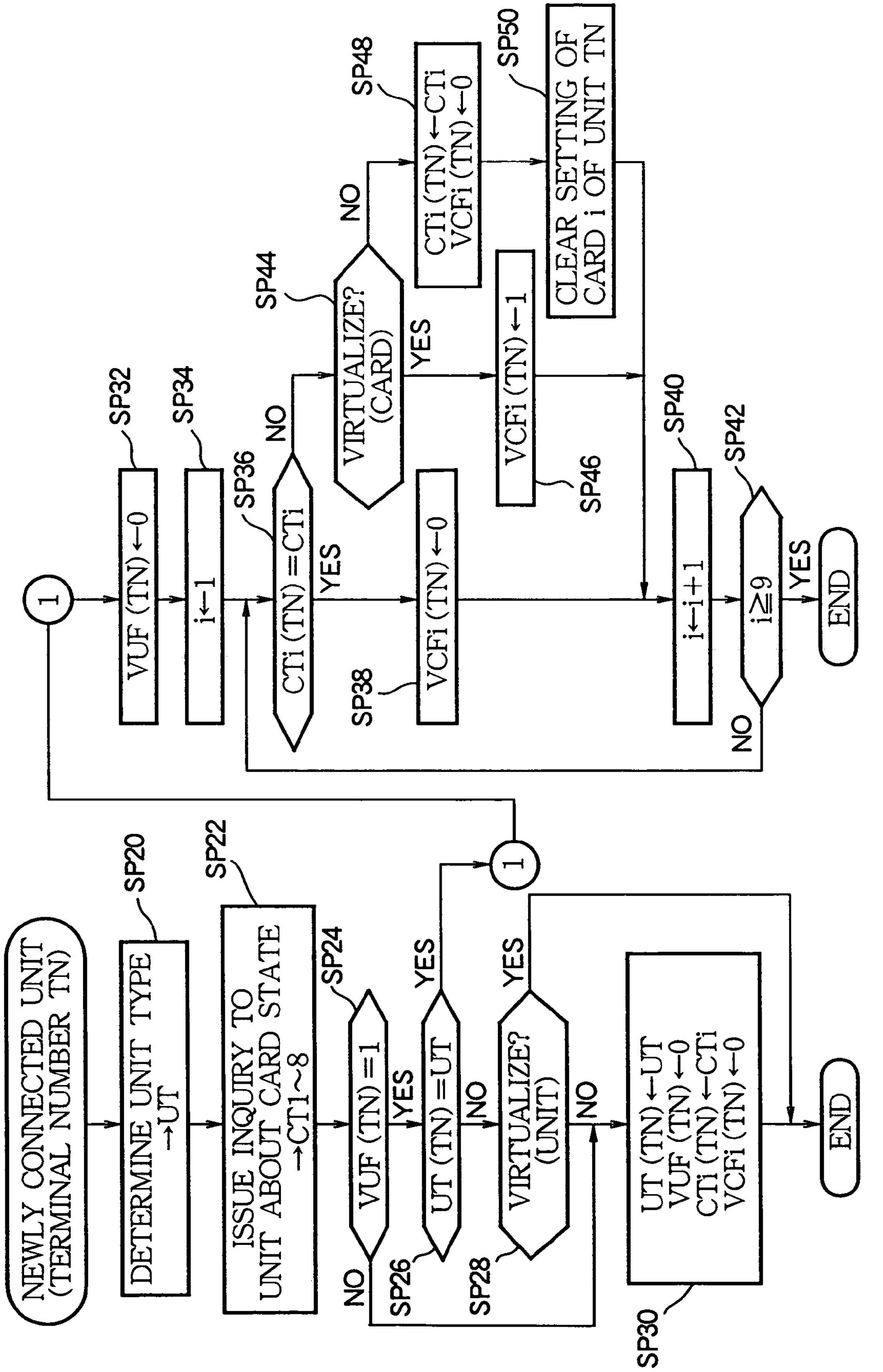
FIG. 6 is a flowchart of a subroutine executed when connection of a new peripheral unit is detected.
Figure 7:
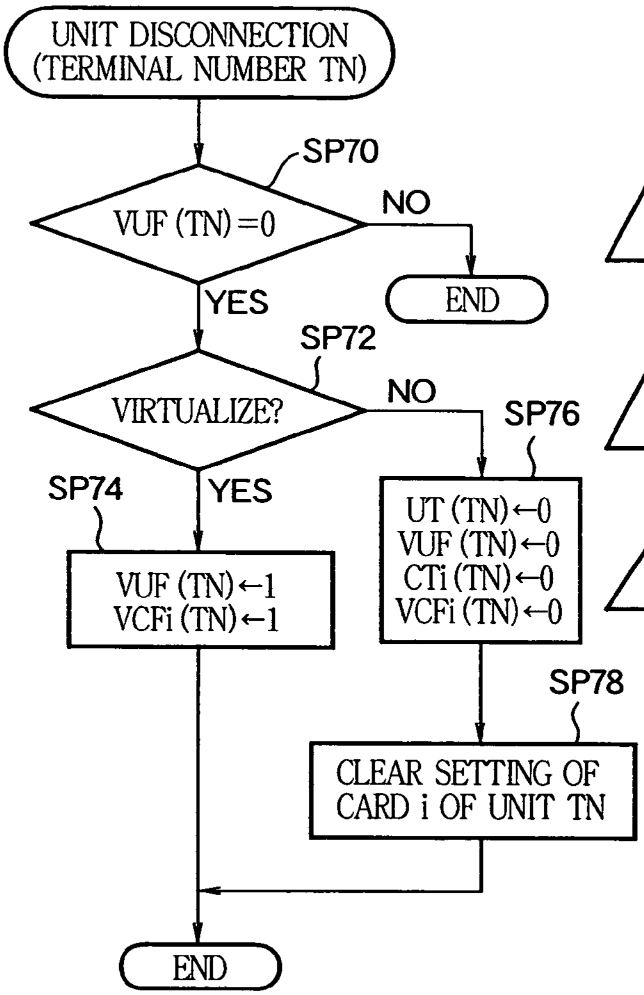
FIG. 7 shows flowcharts of a subroutine executed when a peripheral unit is disconnected from the engine 2000 and an operation performed by an operator.
Figure 7:
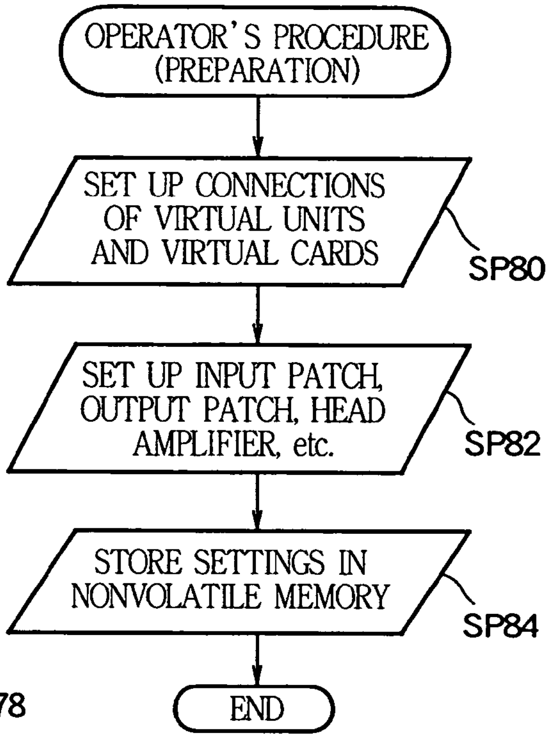
Figure 7:
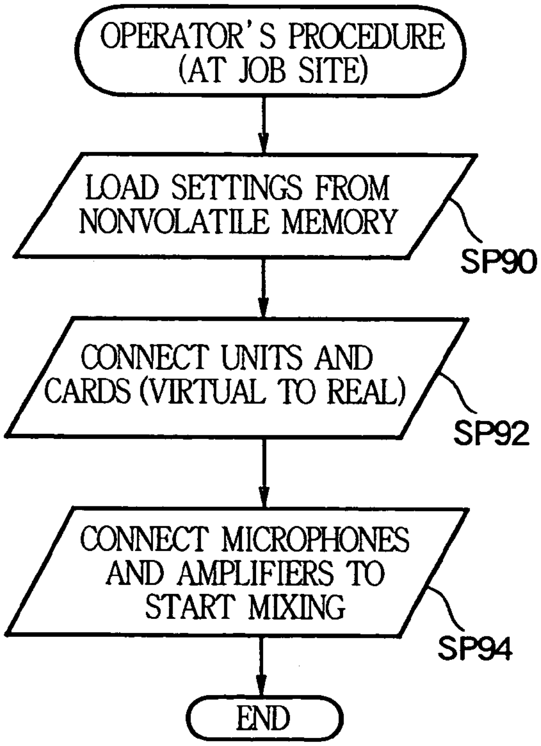

Referring now to FIGS. 5 through 7, the following describes details of the program for implementing the above-mentioned operations.

For convenience of explanation, the program is assumed to run on the console 1000. When the personal computer 2106 is a master for the engine 2000, the program can be also executed on the personal computer 2106. In other words, the program runs on an apparatus which works as a master for the engine 2000.

When the console 1000 is turned on, a main routine in FIG. 5 is executed. When the process proceeds to step SP2 in the figure, a specified initialization is executed. When the process proceeds to step SP4, each section in the digital mixing system is scanned to detect an event that has occurred. The "event" here includes a MIDI signal event, automatic scene changeover, operator's panel operation, connection or disconnection of the units 2200 through 2400, etc.

When the process proceeds to step SP6, it is determined whether or not an event occurs at step SP4. If the result is NO, the process returns to step SP4 to repeat detection of events. If the result is YES, the process proceeds to step SP8 to perform processing corresponding to the detected event. The following describes the contents of various events and associated processing.

2.2.2 Detecting Connection of a New Peripheral Unit (FIG. 6)

(1) Connection to a Terminal that is "Blank"

When the program detects connection of a new peripheral unit to the engine 2000 at step SP4, a subroutine in FIG. 6 is called at step SP6. When the subroutine is called, it is supplied with a terminal number TN of an input/output terminal whose new connection is confirmed. The terminal number TN is sequentially assigned with values "0" through "9" for ten input terminals and "10" through "15" for six output terminals.

When the process proceeds to step SP20 in FIG. 6, the program determines a unit type UT corresponding to the terminal number TN. The unit type UT is a unique value allocated to each model number for the unit. A connection terminal of each unit is provided with a plurality of pins. Some of the pins are used for unit detection. Namely, some pins are strapped to the ground level. The corresponding mode immediately determines the unit type UT.

When the process proceeds to step SP22, the program issues an inquiry to the new unit with the terminal number TN about types of the mounted cards. Upon reception of the inquiry, the unit returns card types CT1 through CT8 of the cards mounted on the first to eighth slots to the console 1000. A value representing each of the card types CT1 through CT8 is uniquely assigned to each model number of the card.

When the process proceeds to step SP24, it is determined whether or not a flag VUF(TN) is set to "1". The flag VUF (TN) indicates whether or not the unit corresponding to the terminal number TN is a virtual unit. The flag VUF(TN) set to "1" indicates a virtual unit. If the result is "NO", the process proceeds to step SP30.

In this state, the new peripheral unit has been connected to the input/output terminal where nothing was connected. In addition, no virtual unit was assigned to that input/output terminal. Accordingly, the input/output terminal was assumed to be "Blank". At step SP30, the value of the unit type UT is set as a variable UT(TN). The variable UT(TN) indicates the unit type UT of a peripheral unit connected to the input/output terminal for the terminal number TN.

Moreover, at step SP30, the flag VUF(TN) is set to "0". This is because a real unit is connected to the terminal number TN. The card type CTi (i=one of 1 through 8) is specified as a value for variable CTi(TN) (i=one of 1 through 8). The variable CTi(TN) indicates the type of a card inserted into the i-th slot of the unit connected to the input/output terminal for the terminal number TN.

Here, a flag VCFi(TN) (i=one of 1 through 8) is set to "0". The flag VCFi(TN) indicates whether or not a virtual card is inserted into the i-th slot of the unit connected to the input/output terminal for the terminal number TN. The flag VCFi (TN) set to "1" indicates a virtual card. As mentioned above, the "Blank" state was originally validated for the input/output terminals corresponding to the terminal number TN. No problem arises if states of the actual cards are reflected as real cards. The routine terminates in this manner. Specifications of the subsequent parameters etc. are based on the contents of the real unit and the real card configured at step SP30.

FIGS. 8 through 27 are used to explain that the contents of the display device 1002 automatically change according to connection states etc. of various peripheral units. The connection states of the various units are determined by referencing the above-mentioned virtual unit flag VUF(TN), unit type UT(TN), card type CTi(TN), and virtual card flag VCFi(TN), etc.

(2) Connecting a Unit that Contradicts the Virtual State

When a virtual unit is defined for the terminal number TN, the above-mentioned step SP24 is determined to be "YES". The process then proceeds to step SP26. Here, it is determined whether or not the variable UT(TN), i.e., the unit type of the terminal number TN for the original virtual unit, equals the unit type of the terminal number TN for the actually connected real unit.

If both differ from each other, "NO" is assumed. The process proceeds to step SP28. At this time, the display device 1002 displays a specified conflicting unit alarm window. The contents of this window are similar to those in the disconnection alarm window 550 (see FIG. 15). The window warns the operator that the specified virtual unit differs from the real unit. The window presents two buttons "YES" and "No" so that the operator can specify whether or not to keep the terminal number TN in the original virtual unit state.

When the operator clicks the "YES" button, the routine terminates. The setup contents of the terminal number TN remain in the virtual unit state. In this case, the display device 1002 may preferably display whether the terminal number TN remains as a mere virtual unit or as a virtual unit conflicting with the real unit.

When the operator clicks the "NO" button at step SP28, the process proceeds to step SP30. The previously defined virtual unit state is ignored. The setup of various parameters will be based on the contents of the real unit and the real card.

(3) Connecting a Unit that Matches the Virtual State

When the unit type UT of the unit newly connected to the terminal number TN matches the virtual unit's unit type UT(TN), "YES" is assumed at step SP26. The process proceeds to step SP32. Here, the virtual unit flag VUF(TN) is set to "0". When the process proceeds to step SP34, "1" is placed in a variable I for counting the slots. The newly connected peripheral unit succeeds the configured of the virtual peripheral unit.

When the process proceeds to step SP36, it is determined whether or not the card type CTi(TN) defined as a virtual card equals the card type CTi of the real card. If both match, "YES" is assumed. The process proceeds to step SP38. The virtual card flag VCFi(TN) for the card is set to "0". Namely, the actually inserted card has the same model number as for the card that is originally identified as a virtual card. Setting the flag VCFi(TN) to "0" turns that card to a real card.

When there is a difference between the card types CTi(TN) and CTi for both cards, "NO" is assumed at step SP36. The process proceeds to step SP44. The display device 1002 displays a conflicting card alarm window having the same contents as for the conflicting unit alarm window described at step SP28. The window presents two buttons "YES" and "NO" so that the operator can specify whether or not keep the card in the original virtual card status.

When the operator clicks the "YES" button, the process proceeds to step SP46. The virtual card flag VCFi(TN) is set to "1". Even if the unit itself is a real unit, each individual card to be specified for the unit can be defined as a virtual card according to the embodiment. Also in this case, the display device 1002 may preferably display whether the virtual card is defined as a mere virtual card or remains as a virtual card conflicting with the real card.

When the operator clicks the "NO" button on the conflicting card alarm window (step SP44), the process proceeds to step SP48. Here, the card type CTi of the real card is specified as the content of the card type CTi(TN). The virtual card flag VCFi(TN) of the card is set to "0". When the process proceeds to step SP50, the setting of the card is cleared to the specified initial state. For example, the gain for the card is decreased to the minimum.

When the process at steps SP36 through SP38 or SP44 through SP50 terminates, the process proceeds to step SP40. Here, a variable i is incremented by "1" for counting the slots. When the process proceeds to step SP42, it is determined whether or not the variable i is greater than or equal to "9". When the result is "YES", the routine terminates. When the result is "NO", the process returns to step SP36. In this case, the setup process at steps SP36 through SP38 or SP44 through SP50 is executed for all slots corresponding to i=1 through 8. Then, the routine terminates.

2.2.3 Detecting Disconnection of a Unit (FIG. 7 (*a*))

When the disconnection of a unit is detected at step SP4 of the main routine, a subroutine FIG. 7 (*a*) is called at step SP6. Also in this case, the subroutine is provided with the terminal number TN of the input/output terminal where the unit is disconnected. When the process proceeds to step SP70 in the figure, it is determined whether or not the virtual unit flag VUF(TN) is set to "0". If the result is "NO", the routine terminates immediately. This means that the unit defined as a virtual unit differs from the actually connected unit. Accordingly, even if the actually connected unit is disconnected, it is unnecessary to correct parameters, etc.

When "YES" is assumed at step SP70, the process proceeds to step SP72. Here, the display device 1002 displays the disconnection alarm window 550 (see FIG. 15) as mentioned above. When the button 552 is clicked to leave the disconnected unit as a virtual unit, the process proceeds to step SP74. Here, the virtual unit flag VUF(TN) is set to "1". In addition, the virtual card flag VCFi(TN) (i=one of 1 through 8) is set to "1" for all slots of the virtual unit. The parameters are reserved in the virtual unit.

When the button 554 is clicked at step SP72 in the disconnection alarm window 550 to delete the disconnected unit, the process proceeds to step SP76. The unit type UT(TN) is set to "0" to indicate "Blank". The virtual unit flag VUF(TN) is set to "0". This indicates an actual state in the sense that the state is "Blank".

At step SP72, the card type CTi(TN) is set to "0" (indicating "Blank") for the cards with i=1 through 8. The virtual card flag VCFi(TN) is set to "0". When the process proceeds to step SP78, the setup contents of the virtual card corresponding to the terminal number TN are all cleared (returned to the initial state). The routine thus terminates.

2.3 Digital Mixing System Setup Operations 2.3.1 Simulation on the Personal Computer Referring now to FIGS. 7 (*b*) and (*c*), the following describes manual operations for setting the digital mixing system according to the embodiment. First, an operator creates an acoustic system diagram for the entire concert hall. The operator then registers necessary units and cards as virtual units and virtual cards using an application program running on the personal computer 1106 (step SP80). The console 1000 may be used for such setup operation. However, the console 1000 is heavy and large, and may be being transported or used for other purposes. Normally, simulation on the personal computer 1106 is used for the setup operation.

Then, the operator configures the input patch section 112 and the output patch section 134. Namely, the input patch display/setup window 600 and a similar output patch display/setup window (not shown) are used to configure the correspondence between physical and logical channels in the virtual units and the virtual cards. A microphone-level input card requires settings of a microphone gain, a phantom power supply, etc. (step SP82) according to microphone types. When the above-mentioned operations are complete, the setup contents are stored as a library (step SP84) in nonvolatile memory (or in a hard disk on a personal computer).

2.3.2 Setup Operations at a Job Site

The following describes operations mainly in a concert hall with reference to FIG. 7 (*c*). First, the console 1000 is installed at a specified location and is connected to the engine 2000. After both blocks are turned on, the personal computer 1106 loads the contents of the library into the console 1000 (step SP90). Thereafter, the operator connects various peripheral units to the engine 2000. Each time a correct unit is connected, the virtual unit is changed to the real unit. When an incorrect unit is connected, an error occurs for the virtual unit. This is notified immediately (step SP92). As mentioned above, it is obvious that the actually connected unit can be used as is.

When all units are connected completely, all virtual units should be changed to real units. After the input/output peripheral units are connected, a microphone, an amplifier, etc. are connected to card terminals in each unit. Because the gain is predetermined for the microphone, the amplifier, etc., these components become available just by connecting them to the cards (step SP94).

According to the embodiment, even if the console 1000 or the engine 2000 are being transported or used for other purposes, it is possible to set up various parameters by using a personal computer alone. The moment that the console 1000 etc. become available, the configured parameters can be reflected on the console 1000 etc. The setup work for the digital mixing system can be completed in a very short time at a job site such as a concert hall where acoustic facilities need to be installed.

Namely, the first inventive method is designed for controlling an audio apparatus having a main block including engine 2000 configurable for processing audio signals such as modifying and mixing of the audio signals, and peripheral units 2200-2400 of various types being equipped with components such as cards 102, 104, 106, 142 and 144 of various types and being connectable to the main block for inputting the audio signals to be processed and outputting the audio signals processed by the main block. The inventive method is carried out by a first detection step SP4 of detecting when a new peripheral unit is connected to the main block, a second detection step SP20 of detecting a type of the new peripheral unit, and an inquiry step SP22 of inquiring the new peripheral unit upon detection thereof about a type of a component equipped in the new peripheral unit and obtaining a reply indicating the type from the new peripheral unit, whereby the main block can be configured according to the detected type of the new peripheral unit and the type of the component thereof indicated by the reply.

Preferably, the main block has physical channels allocatable to the peripheral units for inputting or outputting the audio signals and logical channels configurable for processing the audio signals. The inventive method further comprises a display step of displaying a correspondence (FIG. 8, window 600) between the physical channels and the logical channels, and an update step (FIG. 9 and FIG. 10) of updating the displayed correspondence when the new peripheral unit is connected to the main block according to either of the type of the new peripheral unit and the type of the component of the new peripheral unit.

Preferably, the peripheral units of the various types have a connector comprised of a set of pins disposed in a strap arrangement specific to the type of the peripheral unit for connection with the main block, such that the second detection step SP20 detects the type of the new peripheral unit according to the specific strap arrangement of the pins of the new peripheral unit.

Preferably, the inventive method further comprises a configuration step of generating a configuration screen (FIG. 23, card status display part 264) on a display monitor 1002 to present parameters of the new peripheral unit or the component thereof based on either of the type of the new peripheral unit or the type of the component equipped in the new peripheral unit, such that the parameters can be set on the configuration screen for configuring the main block. Further, the configuration step comprises displaying the configuration screen (FIG. 27, input channel setting window 750) containing the parameters arranged in correspondence to channels of the audio signals provided in the main block for processing the audio signals.

The second inventive method is designed for controlling an audio apparatus having a main block configurable for processing audio signals through logical channels, and peripheral units connectable to the main block through physical channels for inputting the audio signals to be processed or outputting the audio signals processed by the main block. The inventive the method is carried out by a first display step (FIG. 8, input patch setting window 600) of displaying a correspondence on a monitor 1002 between the physical channels allocated to the peripheral units which are actually connected or potentially connectable, such that the displayed correspondence may have initially a non-organized arrangement, a detection step of detecting a command (click of "AUTO SETUP" button 610) to rearrange the correspondence between the physical channels and the logical channels, and a second display step (FIG. 12) of again displaying the correspondence which is rearranged in response to the detecting of the command from the initial non-organized state into a renewed organized state according to a predetermined rule as indicated in the matrix pattern of FIG. 12.

Preferably, the first and second display steps display the correspondence in a matrix such that the physical channels are arranged in one of rows and columns of the matrix and the logical channels are arranged in the other of rows and columns of the matrix so that a pair of a physical channel and a logical channel corresponding to each other is indicated by a symbol such as a circle placed at an intersection between the row and the column of the matrix.

The third inventive method is designed for controlling an audio apparatus comprised of a main block having channels for processing audio signals, and peripheral units of various types having parameters configurable for inputting the audio signals to the main block and outputting the audio signals from the main block, the peripheral units including a real peripheral unit actually connected to the main block and a virtual peripheral unit reserved for potential connection to the main block. The inventive method is carried out by a first configuration step of conducting configuration of the virtual peripheral unit upon identification of the type of the virtual peripheral unit, the configuration including at least one of setting of the parameters of the virtual peripheral unit (FIG. 23, card status display part 264) and allocating of the cannel to the virtual peripheral unit (input patch setting window 600), a detection step SP4 of detecting a new peripheral unit which is newly connected to the main block, and a second configuration step SP38 conducted when the type of the detected new peripheral unit is identical to the type of the virtual peripheral unit (YES at SP26) for allowing the new peripheral unit to succeed the configuration of the virtual peripheral unit.

Preferably, the first configuration step comprises identifying a type of a virtual component equipped in the virtual peripheral unit and conducting configuration of the virtual component according to the identified type thereof, the configuration including at least one of setting of parameters of the virtual component and allocating of the channel to the virtual component, and the second configuration step is conducted when a type of a component equipped in the new peripheral unit is identical to the type of the virtual component (YES at SP36) for allowing the component of the new peripheral unit to succeed the configuration of the virtual component.

Preferably, the first configuration step comprises identifying a type of a virtual component potentially equipped in the virtual peripheral unit and conducting configuration of the virtual component according to the identified type thereof by setting of parameters of the virtual component, and the second configuration step is conducted when a type of a component equipped in the new peripheral unit is not identical to the type of the virtual component (NO at SP36) for prompting an operator of the audio apparatus to select either of reserving the setting of the parameters of the virtual component in the main block or replacing the setting of the parameters of the virtual component by new setting of parameters of the component equipped in the new peripheral unit.

The fourth inventive method is designed for controlling an audio apparatus comprised of a main block having channels for processing audio signals, and peripheral units of various types having parameters configurable for inputting the audio signals to the main block and outputting the audio signals from the main block, the peripheral units including a real peripheral unit actually connected to the main block and a virtual peripheral unit reserved for potential connection to the main block. The inventive method is carried out by a first configuration step of conducting configuration of the virtual peripheral unit upon identification of the type of the virtual peripheral unit, the configuration including at least one of setting of the parameters of the virtual peripheral unit and allocating of the cannel to the virtual peripheral unit, a detection step SP4 of detecting a new peripheral unit which is newly connected to the main block, a prompt step SP28 called when a type of the detected new peripheral unit is not identical to the type of the virtual peripheral unit (NO at SP26) for prompting an alarm together with a first option and a second option, a reservation step conducted when the first option is selected (YES) for reserving the configuration of the virtual peripheral unit, and a second configuration step SP30 conducted when the second option is selected (NO) for replacing the setting of the parameters of the virtual peripheral unit by setting of parameters of the new peripheral unit.

The fifth inventive method is designed for controlling an audio apparatus comprised of a main block having channels for processing audio signals, and peripheral units having parameters settable for inputting the audio signals to the main block and outputting the audio signals from the main block. The inventive method is carried out by a configuration step of conducting configuration for each of the peripheral units connected to the main block, the configuration including at least one of setting of the parameters of each peripheral unit and allocating of the channels to each peripheral unit, a detection step SP4 of detecting when at least one of the peripheral units is disconnected from the main block, a prompt step SP72 of prompting disconnection of said one peripheral unit to an operator of the audio apparatus along with a first option and a second option, a reservation step called when the first option is selected (YES) by the operator for reserving the configuration of said one peripheral unit in the main block while indicating that said one peripheral unit is actually disconnected from the main block (set VUF (TN) to 1), and a cancel step SP76 and SP78 called when the second option is selected (NO) by the operator for canceling the configuration of said one peripheral unit from the main block.

3. Modifications

The present invention is not limited to the above-mentioned embodiment. For example, various modifications may be made as follows.

(1) In the above-mentioned embodiment, the application program running on a personal computer is used for simulation of the digital mixing system. The application program alone can be distributed by storing it on recording media such as CD-ROM, floppy disks, etc. or by transferring it via transmission paths.

(2) The input patch display/setup window 600 according to the above-mentioned embodiment provides the only method of automatically setting the correspondence between logical and physical channels. Namely, the "AUTO SETUP" button 610 is clicked to line up circles in the matrix. Further, it may be preferable to provide a plurality of auto-setup modes so that an operator can select any of them.

As mentioned above, according to the invention, the system inquires the newly connected peripheral unit about components equipped in the new peripheral unit and obtains the reply indicating the type of the components. Thus, configuration work of the audio signal mixing apparatus can be readily carried out without actually inspecting the components equipped in the new peripheral unit.

As mentioned above, a new peripheral unit inherits settings of the virtual unit when the type of the new peripheral unit matches the type of the virtual unit. According to this configuration, various provisional settings are available even if no unit is actually connected. These settings can be completed promptly when the associated units are actually connected.

When a peripheral unit is disconnected, an operator is provided with the first and second options. According to this configuration, the operator can leave the unconnected unit's setting unchanged. When the same unit is reconnected, its setting can be resumed and completed promptly.

What is claimed is:

1. A method of controlling an audio apparatus comprised of a main block having channels for processing audio signals, and real peripheral units of various types, connectable to the main block and having physical channels and parameters configurable, for inputting the audio signals to the main block or outputting the audio signals from the main block, the method conducted by the main block or a computer used for setting of the audio apparatus, the method comprising:

a selecting step of selecting, in response to operation by an operator, a virtual peripheral unit among various types of virtual peripheral units corresponding to the various types of the real peripheral units;

a displaying step of displaying the parameters of the selected virtual peripheral unit or an allocation of the channels of the main block to the physical channels of the selected virtual peripheral unit, on a display of the main block or the computer;

a first configuration step of specifying, in response to operation by the operator, the parameters of the selected virtual peripheral unit or the allocation of the channels of the main block to the physical channels of the selected virtual peripheral unit displayed by the displaying step;

a detection step of detecting a real peripheral unit which is newly connected to the main block;

a judging step of judging whether the type of the detected real peripheral unit is identical to the type of the selected virtual peripheral unit or not; and a second configuration step, conducted when the judging step is affirmative, of allowing the detected real peripheral unit to succeed the parameters of the selected virtual peripheral unit or the allocation of the channels of the main block to the physical channels of the selected virtual peripheral unit specified by the first configuration step.

2. The method according to claim 1, wherein the real peripheral unit can mount real components of various types, each of the real components having parameters and physical channels, wherein the selecting step further comprises a component selecting step of selecting, in response to operation by the user, one or more virtual components to be mounted by the selected virtual peripheral unit, among various types of virtual components corresponding to the various types of real components, wherein the displaying step displays the parameters of the selected one or more virtual components or the allocation of the channels of the main block to the physical channels of the selected one or more virtual components, wherein the first configuration step specifies, in response to operation by the user, the parameters of the selected one or more virtual components or the allocation of the channels of the main block to the physical channels of the selected one or more virtual components, and wherein the second configuration step comprises a component judging step of judging for each of the real components mounted by the detected real peripheral unit, whether the type of the real component is identical to the type of the virtual component corresonding to the real component, and a component configuration step, conducted for each of the real components mounted by the detected real peripheral unit when the component judging step is affirmative for the real component, of allowing the real component to succeed the parameters of the corresponding virtual component or the allocation of the channels of the main block to the physical channels of the corresponding virtual component.

3. The method according to claim 2, wherein the second configuration step comprises a prompting step, conducted for each of the real components when the component judging step is negative for the real component, of prompting the user to select either of reserving the parameters of the corresponding virtual component or replacing the parameters of the corresponding virtual component by the parameters of real component mounted by the detected real peripheral unit.

4. A method of controlling an audio apparatus comprised of a main block having channels for processing audio signals, and real peripheral units of various types, connectable to the main block and having ihysical channels and parameters configurable, for inputting the audio signals to the main block or outputting the audio signals from the main block, the method conducted by the main block or a computer used for settings of the audio apparatus, the method comprising:

a selecting step of selecting, in response to operation by an operator, a virtual peripheral unit among various types of virtual peripheral units corresponding to the various types of the real peripheral units;

a displaying step of displaying the parameters of the selected virtual peripheral unit or an allocation of the channels of the main block to the physical channels of the selected virtual peripheral unit, on a display of the main block or the computer;

a first configuration step of specifying, in response to operation by the operator, the parameters of the selected virtual peripheral unit or the allocation of the channels of the main block to the physical channels of the selected virtual peripheral unit displayed by the displaying step;

a detection step of detecting a real peripheral unit which is newly connected to the main block;

a prompt step called when a type of the detected real peripheral unit is not identical to the type of the selected virtual peripheral unit for prompting an alarm together with a first option and a second option;

a reservation step conducted when the first option is selected for reserving the configuration of the selected virtual peripheral unit; and a second configuration step conducted when the second option is selected for replacing the setting of the parameters of the selected virtual peripheral unit or the allocation of the channels of the main block to the physical channels of the selected virtual unit by the setting of the parameters of the detected real peripheral unit or the allocation of the channels of the main block to the physical channels of the detected real peripheral unit.

5. A method according to claim 1, further comprising:

a second detection step of detecting disconnection of at least one of the real peripheral units from the main block;

a prompt step, conducted when the disconnection of said one real peripheral unit is detected, of alerting the disconnection of said one real peripheral unit to the user and prompting the user to select either of a first option and a second option;

a reservation step, conducted when the first option is selected by the user, of reserving the parameters of said one real peripheral unit or the allocation of the channels of the main block to the physical channels of said one real peripheral unit in the main block as the parameters of a virtual peripheral unit or the allocation of the channels of the main block to the physical channels of a virtual peripheral unit while indicating that said one peripheral unit is actually disconnected from the main block; and a deleting step, conducted when the second option is selected by the user, of deleting the parameters of said one peripheral unit or the allocation of the channels of the main block to the physical channels of said one real peripheral unit in the main block.

6. An audio apparatus comprising a main block having channels for processing audio signals, and real peripheral units of various types, connectable to the main block and having physical channels and parameters configurable, for inputting the audio signals to the main block or outputting the audio signals from the main block, wherein the main block or a computer used for settings of the audio apparatus comprises:

a selecting section that selects, in response to operation by an operator, a virtual peripheral unit among various types of virtual peripheral units corresponding to the various types of the real peripheral units;

a displaying section that displays the parameters of the selected virtual peripheral unit or an allocation of the channels of the main block to the physical channels of the selected virtual peripheral unit;

a first configuration section that specifies, in response to operation by the operator, the parameters of the selected virtual peripheral unit or the allocation of the channels of the main block to the physical channels of the selected virtual peripheral unit displayed by the displaying section;

a detection section that detects a real peripheral unit which is newly connected to the main block;

a judging section that judges whether the type of the detected real peripheral unit is identical to the type of the selected virtual peripheral unit or not; and a second configuration section that is operated, when the judgment of the judging section is affirmative, of allowing the detected real peripheral unit to succeed the parameters of the selected virtual peripheral unit or the allocation of the channels of the main block to the physical channels of the selected virtual peripheral unit specified by the first configuration section.

7. The audio apparatus according to claim 6, wherein the real peripheral unit can mount real components of various types, each of the real components having parameters and physical channels, wherein the selecting section further comprises a component selecting section that selects, in response to operation by the user, one or more virtual components to be mounted by the selected virtual peripheral unit, among various types of virtual components corresponding to the various types of real components, wherein the displaying section displays the parameters of the selected one or more virtual components or the allocation of the channels of the main block to the physical channels of the selected one or more virtual components, wherein the first configuration step specifies, in response to operation by the user, the parameters of the selected one or more virtual components or the allocation of the channels of the main block to the physical channels of the selected one or more virtual components, and wherein the second configuration section comprises a component judging section that judges each of the real components mounted by the detected real peripheral unit, whether the type of the real component is identical to the type of the virtual component corresonding to the real component, and a component configuration section, operating for each of the real components mounted by the detected real peripheral unit when the judgment of the component judging section is affirmative for the real component, that allows the real component to succeed the parameters of the corresponding virtual component or the allocation of the channels of the main block to the physical channels of the corresponding virtual component.

8. The audio apparatus according to claim 7, wherein wherein the second configuration section comprises a prompting section, operating for each of the real components when the judgment of the component judging section is negative for the real component, that prompts the user to select either of reserving the parameters of the corresponding virtual component or replacing the parameters of the corresponding virtual component by the parameters of real component mounted by the detected real peripheral unit.

9. An audio apparatus comprising a main block having channels for processing audio signals, and real peripheral units of various types, connectable to the main block and having physical channels and parameters configurable1 for inputting the audio signals to the main block or outputting the audio signals from the main block, wherein the main block or a computer used for settings of the audio apparatus comprises:

a selecting section that selects, in response to operation by an operator, a virtual peripheral unit among various types of virtual peripheral units corresponding to the various types of the real peripheral units;

a displaying section that displays the parameters of the selected virtual peripheral unit or an allocation of the channels of the main block to the physical channels of the selected virtual peripheral unit;

a first configuration section that specifies, in response to operation by the operator, the parameters of the selected virtual peripheral unit or the allocation of the channels of the main block to the physical channels of the selected virtual peripheral unit displayed by the displaying section;

a detection section that detects a real peripheral unit which is newly connected to the main block;

a prompt section that is operated when a type of the detected real peripheral unit is not identical to the type of the selected virtual peripheral unit for prompting an alarm together with a first option and a second option;

a reservation section that is operated when the first option is selected for reserving the configuration of the selected virtual peripheral unit; and a second configuration section that is operated when the second option is selected for replacing the setting of the parameters of the selected virtual peripheral unit or the allocation of the channels of the main block to the physcial channels of the selected virtual unit by the setting of the parameters of the detected real peripheral unit or the allocation of the channels of the main block to the physical channels of the detected real peripheral unit.

10. The audio apparatus according to claim 6, wherein the main block further comprises:

a second detection section that detects disconnection of at least one of the real peripheral units from the main block;

a prompt section, operating when the disconnection of said one real peripheral unit is detected that alerts the disconnection of said one real peripheral unit to the user and prompts the user to select either of a first option and a second option;

a reservation section, operating when the first option is selected by the user, that reserves the parameters of said one real peripheral unit or the allocation of the channels of the main block to the physical channels of said one real peripheral unit in the main block as the parameters of a virtual peripheral unit or the allocation of the channels of the main block to the physical channels of a virtual peripheral unit while indicating that said one real peripheral unit is actually disconnected from the main block; and a deleting section, operating when the second option is selected by the user, that deletes the parameters of said one real peripheral unit or the allocation of the channels of the main block to the physical channels of said one real peripheral unit in the main block.

11. A machine readable medium for use in an audio apparatus comprised of a main block having channels for processing audio signals, and real peripheral units of various types, connectable to the main unit and having physical channels and parameters configurable, for inputting the audio signals to the main block and or outputting the audio signals from the main block, the medium containing program instructions executable by the main block or a computer used for settings of the audio apparatus to perform a control process comprising:

a selecting step of selecting, in response to operation by an operator, a virtual peripheral unit among various types of virtual peripheral units corresponding to the various types of the real peripheral units;

a displaying step of displaying the parameters of the selected virtual peripheral unit or an allocation of the channels of the main block to the physical channels of the selected virtual peripheral unit, on a display of the main block or the computer;

a first configuration step of specifying, in response to operation by the operator, the parameters of the selected virtual peripheral unit or the allocation of the channels of the main block to the physical channels of the selected virtual peripheral unit displayed by the displaying step;

a detection step of detecting a real peripheral unit which is newly connected to the main block;

a judging step of judging whether the type of the detected real peripheral unit is identical to the type of the selected virtual peripheral unit or not; and a second configuration step, conducted when the judging step is affirmative, of allowing the detected real peripheral unit to succeed the parameters of the selected virtual peripheral unit or the allocation of the channels of the main block to the physical channels of the selected virtual peripheral unit specified by the first configuration step.

12. The machine readable medium according to claim 11, wherein the real peripheral unit can mount real components of various types, each of the real components having parameters and physical channels, wherein the selecting step further comprises a component selecting step of selecting, in response to operation by the user, one or more virtual components to be mounted by the selected virtual peripheral unit, among various types of virtual components corresponding to the various types of real components, wherein the displaying step displays the parameters of the selected one or more virtual components or the allocation of the channels of the main block to the physical channels of the selected one or more virtual components, wherein the first configuration step specifies, in response to operation by the user, the parameters of the selected one or more virtual components or the allocation of the channels of the main block to the physical channels of the selected one or more virtual components, and wherein the second configuration step comprises a component judging step of judging for each of the real components mounted by the detected real peripheral unit, whether the type of the real component is identical to the type of the virtual component corresonding to the real component, and a component configuration step, conducted for each of the real components mounted by the detected real peripheral unit when the component judging step is affirmative for the real component, of allowing the real component to succeed the parameters of the corresponding virtual component or the allocation of the channels of the main block to the physical channels of the corresponding virtual component.

13. The machine readable medium according to claim 12, wherein the second configuration step compnses a prompting step, conducted for each of the real components when the component judging step is negative for the real component, of prompting the user to select either of reserving the parameters of the corresponding virtual component or replacing the parameters of the corresponding virtual component by the parameters of real component mounted by the detected real peripheral unit.

14. A machine readable medium for use in an audio apparatus comprised of a main block having channels for processing audio signals, and real peripheral units of various types, connectable to the main unit and having physical channels and parameters configurable, for inputting the audio signals to the main block or outputting the audio signals from the main block, the medium containing program instructions executable by the main block or a computer used for settings of the audio apparatus to perform a control process comprising:

a selecting step of selecting, in response to operation by an operator, a virtual peripheral unit among various types of virtual peripheral units corresponding to the various types of the real peripheral units;

a displaying step of displaying the parameters of the selected virtual peripheral unit or an allocation of the channels of the main block to the physical channels of the selected virtual peripheral unit, on a display of the main block or the computer;

a first configuration step of specifying, in response to operation by the operator, the parameters of the selected virtual peripheral unit or the allocation of the channels of the main block to the physical channels of the selected virtual peripheral unit displayed by the displaying step;

a detection step of detecting a real peripheral unit which is newly connected to the main block;

a prompt step called when a type of the detected real peripheral unit is not identical to the type of the selected virtual peripheral unit for prompting an alarm together with a first option and a second option;

a reservation step conducted when the first option is selected for reserving the configuration of the selected virtual peripheral unit; and a second configuration step conducted when the second option is selected for replacing the setting of the parameters of the selected virtual peripheral unit or the allocation of the channels of the main block to the physical channels of the selected virtual unit by the setting of the parameters of the detected real peripheral unit or the allocation of the channels of the main block to the physical channels of the detected real peripheral unit.

15. The machine readable medium according to claim 11, wherein the medium containing program instructions executable by the main block or the computer used for settings of the audio apparauts to perform a control process further comprising:

a second detection step of detecting disconnection of at least one of the real peripheral units from the main block;

a prompt step, conducted when the disconnection of said one real peripheral unit is detected, of alerting the disconnection of said one real peripheral unit to the user and prompting the user to select either of a first option and a second option;

a reservation step, conducted when the first option is selected by the user, of reserving the parameters of said one real peripheral unit or the allocation of the channels of the main block to the physical channels of said one real peripheral unit in the main block as the parameters of a virtual peripheral unit or the allocation of the channels of the main block to the physical channels of a virtual peripheral unit while indicating that said one real peripheral unit is actually disconnected from the main block; and a deleting step, conducted when the second option is selected by the user, of deleting the parameters of said one real peripheral unit or the allocation of the channels of the main block to the physical channels of said one real peripheral unit in the main block.

* * * * *